US008872459B2

(12) United States Patent
Yang et al.

(10) Patent No.: US 8,872,459 B2
(45) Date of Patent: Oct. 28, 2014

(54) TRASH CANS WITH VARIABLE GEARING ASSEMBLIES

(75) Inventors: Frank Yang, Rancho Palos Verdes, CA (US); Christopher Fruhauf, San Anselmo, CA (US); Michael Basha, Brisbane, CA (US); David Wolbert, Redondo Beach, CA (US); Kenneth Yen, Torrance, CA (US)

(73) Assignee: simplehuman, LLC, Torrance, CA (US)

( * ) Notice: Subject to any disclaimer, the term of this patent is extended or adjusted under 35 U.S.C. 154(b) by 248 days.

(21) Appl. No.: 13/417,084

(22) Filed: Mar. 9, 2012

(65) Prior Publication Data

US 2013/0233853 A1 Sep. 12, 2013

(51) Int. Cl.
*G05B 5/00* (2006.01)

(52) U.S. Cl.
USPC ............................ 318/468; 318/480; 318/436

(58) Field of Classification Search
USPC ............. 318/12, 468, 16, 480, 436, 267, 282, 318/286, 466
See application file for complete search history.

(56) References Cited

U.S. PATENT DOCUMENTS

| | | | |
|---|---|---|---|
| 1,426,211 | A | 8/1922 | Pausin |
| 1,461,253 | A | 7/1923 | Obadiah |
| 1,754,802 | A | 4/1930 | Raster |
| 1,820,555 | A | 8/1931 | Buschman |
| 1,891,651 | A | 12/1932 | Padelford et al. |
| 1,922,729 | A | 8/1933 | Giebel |
| 1,980,938 | A | 11/1934 | Geibel |
| 2,308,326 | A | 1/1943 | Calcagno |
| D148,825 | S | 2/1948 | Snider |
| 2,457,274 | A | 12/1948 | Rifken |
| 2,759,625 | A | 8/1956 | Ritter |
| 2,888,307 | A | 5/1959 | Graves et al. |
| 2,946,474 | A | 7/1960 | Knapp |
| 3,008,604 | A | 11/1961 | Garner |
| 3,023,922 | A | 3/1962 | Arrington et al. |
| 3,137,408 | A | 6/1964 | Taylor |
| 3,654,534 | A | 4/1972 | Fischer |
| 3,820,200 | A | 6/1974 | Myers |
| 3,825,150 | A | 7/1974 | Taylor |
| 3,825,215 | A | 7/1974 | Borglum |
| 3,886,425 | A | 5/1975 | Weiss |

(Continued)

FOREIGN PATENT DOCUMENTS

| | | |
|---|---|---|
| AU | 622536 | 4/1992 |
| CA | 2519295 | 3/2007 |

(Continued)

OTHER PUBLICATIONS

U.S. Appl. No. 29/411,482, filed Jan. 20, 2012, Yang et al.

(Continued)

*Primary Examiner* — Karen Masih
(74) *Attorney, Agent, or Firm* — Knobbe, Martens, Olson & Bear, LLP

(57) ABSTRACT

A trash can with a power operated lid can include a lifting mechanism with a motor, a lifting member, and a variable gear. In some embodiments, the motor is operably connected with the variable gear such that the motor can drive the variable gear and/or the lifting member. In certain implementations, the variable gear includes one or more teeth with varying tooth radii. In some variants, the variable gear and a clutch member are engageable and are configured to allow manual operation of the lid.

23 Claims, 21 Drawing Sheets

(56) References Cited

U.S. PATENT DOCUMENTS

| | | | |
|---|---|---|---|
| 3,891,115 | A | 6/1975 | Ono |
| 4,014,457 | A | 3/1977 | Hodge |
| 4,027,774 | A | 6/1977 | Cote |
| 4,081,105 | A | 3/1978 | Dagonnet et al. |
| 4,189,808 | A | 2/1980 | Brown |
| 4,200,197 | A | 4/1980 | Meyer et al. |
| 4,217,616 | A | 8/1980 | Jessup |
| 4,303,174 | A | 12/1981 | Anderson |
| 4,320,851 | A | 3/1982 | Montoya |
| 4,357,740 | A | 11/1982 | Brown |
| 4,416,197 | A | 11/1983 | Kehl |
| 4,457,483 | A | 7/1984 | Gagne |
| 4,535,911 | A | 8/1985 | Goulter |
| 4,570,304 | A | 2/1986 | Montreuil et al. |
| 4,576,310 | A | 3/1986 | Isgar et al. |
| D284,320 | S | 6/1986 | Kubic et al. |
| 4,609,117 | A | 9/1986 | Pamment |
| 4,630,332 | A | 12/1986 | Bisbing |
| 4,630,752 | A | 12/1986 | DeMars |
| 4,664,347 | A | 5/1987 | Brown et al. |
| 4,697,312 | A | 10/1987 | Freyer |
| 4,711,161 | A | 12/1987 | Swin et al. |
| 4,729,490 | A | 3/1988 | Ziegenbein |
| 4,753,367 | A | 6/1988 | Miller et al. |
| 4,763,808 | A | 8/1988 | Guhl et al. |
| 4,765,548 | A | 8/1988 | Sing |
| 4,765,579 | A | 8/1988 | Robbins et al. |
| 4,792,039 | A | 12/1988 | Dayton |
| 4,794,973 | A | 1/1989 | Perisic |
| 4,834,260 | A | 5/1989 | Auten |
| 4,863,053 | A | 9/1989 | Oberg |
| 4,867,339 | A | 9/1989 | Hahn |
| 4,884,717 | A | 12/1989 | Bussard et al. |
| 4,892,223 | A | 1/1990 | DeMent |
| 4,892,224 | A | 1/1990 | Graham |
| 4,913,308 | A | 4/1990 | Culbertson |
| 4,915,347 | A | 4/1990 | Iqbal et al. |
| 4,918,568 | A | 4/1990 | Stone et al. |
| D308,272 | S | 5/1990 | Koepsell |
| 4,923,087 | A | 5/1990 | Burrows |
| 4,948,004 | A | 8/1990 | Chich |
| 4,964,523 | A | 10/1990 | Bieltvedt et al. |
| 4,972,966 | A | 11/1990 | Craft, Jr. |
| 4,996,467 | A | 2/1991 | Day |
| 5,031,793 | A | 7/1991 | Chen et al. |
| 5,048,903 | A | 9/1991 | Loblein |
| 5,054,724 | A | 10/1991 | Hutcheson |
| 5,065,272 | A | 11/1991 | Owen et al. |
| 5,065,891 | A | 11/1991 | Casey |
| D323,573 | S | 1/1992 | Schneider |
| 5,090,785 | A | 2/1992 | Stamp |
| 5,100,087 | A | 3/1992 | Ashby |
| 5,111,958 | A | 5/1992 | Witthoeft |
| D327,760 | S | 7/1992 | Donnelly |
| D329,929 | S | 9/1992 | Knoedler et al. |
| 5,147,055 | A | 9/1992 | Sampson et al. |
| 5,156,290 | A | 10/1992 | Rodrigues |
| 5,170,904 | A | 12/1992 | Neuhaus |
| 5,174,462 | A | 12/1992 | Hames |
| 5,213,272 | A | 5/1993 | Gallagher et al. |
| 5,222,704 | A | 6/1993 | Light |
| D337,181 | S | 7/1993 | Warman |
| 5,226,558 | A | 7/1993 | Whitney et al. |
| 5,230,525 | A | 7/1993 | Delmerico et al. |
| 5,242,074 | A | 9/1993 | Conaway et al. |
| D340,333 | S | 10/1993 | Duran et al. |
| 5,249,693 | A | 10/1993 | Gillispie et al. |
| 5,261,553 | A | 11/1993 | Mueller et al. |
| 5,305,916 | A | 4/1994 | Suzuki et al. |
| 5,314,151 | A | 5/1994 | Carter-Mann |
| 5,322,179 | A | 6/1994 | Ting |
| 5,329,212 | A | 7/1994 | Feigleson |
| 5,348,222 | A | 9/1994 | Patey |
| 5,381,588 | A | 1/1995 | Nelson |
| 5,385,258 | A | 1/1995 | Sutherlin |
| 5,390,818 | A | 2/1995 | LaBuda |
| 5,404,621 | A | 4/1995 | Heinke |
| 5,407,089 | A | 4/1995 | Bird et al. |
| 5,419,452 | A | 5/1995 | Mueller et al. |
| 5,471,708 | A | 12/1995 | Lynch |
| 5,474,201 | A | 12/1995 | Liu |
| 5,501,358 | A | 3/1996 | Hobday |
| 5,520,067 | A | 5/1996 | Gabas |
| 5,520,303 | A | 5/1996 | Bernstein et al. |
| 5,531,348 | A | 7/1996 | Baker et al. |
| 5,535,913 | A | 7/1996 | Asbach et al. |
| 5,558,254 | A | 9/1996 | Anderson et al. |
| D377,554 | S | 1/1997 | Adriaansen |
| 5,611,507 | A | 3/1997 | Smith |
| 5,628,424 | A | 5/1997 | Gola |
| 5,632,401 | A | 5/1997 | Hurd |
| 5,636,416 | A | 6/1997 | Anderson |
| 5,644,111 | A | 7/1997 | Cerny et al. |
| 5,645,186 | A | 7/1997 | Powers et al. |
| 5,650,680 | A | 7/1997 | Chula |
| D383,277 | S | 9/1997 | Peters |
| 5,662,235 | A | 9/1997 | Nieto |
| 5,690,247 | A | 11/1997 | Boover |
| 5,695,088 | A | 12/1997 | Kasbohm |
| 5,699,929 | A | 12/1997 | Ouno |
| D388,922 | S | 1/1998 | Peters |
| D389,631 | S | 1/1998 | Peters |
| 5,704,511 | A | 1/1998 | Kellams |
| 5,724,837 | A | 3/1998 | Shin |
| 5,730,312 | A | 3/1998 | Hung |
| 5,732,845 | A | 3/1998 | Armaly, Jr. |
| 5,735,495 | A | 4/1998 | Kubota |
| 5,738,239 | A | 4/1998 | Triglia |
| 5,799,909 | A | 9/1998 | Ziegler |
| 5,816,431 | A | 10/1998 | Giannopoulos |
| 5,816,640 | A | 10/1998 | Nishimura |
| D401,383 | S | 11/1998 | Gish |
| D401,719 | S | 11/1998 | Van Leeuwen et al. |
| 5,873,643 | A | 2/1999 | Burgess, Jr. et al. |
| 5,881,896 | A | 3/1999 | Presnell et al. |
| 5,881,901 | A | 3/1999 | Hampton |
| 5,884,237 | A | 3/1999 | Kanki et al. |
| 5,887,748 | A | 3/1999 | Nguyen |
| 5,967,392 | A | 10/1999 | Niemi et al. |
| 5,987,708 | A | 11/1999 | Newton |
| 6,000,569 | A | 12/1999 | Liu |
| 6,010,024 | A | 1/2000 | Wang |
| 6,024,238 | A | 2/2000 | Jaros |
| 6,036,050 | A | 3/2000 | Ruane |
| 6,102,239 | A | 8/2000 | Wien |
| 6,123,215 | A | 9/2000 | Windle |
| D431,700 | S | 10/2000 | Roudebush |
| 6,126,031 | A | 10/2000 | Reason |
| 6,129,233 | A | 10/2000 | Schiller |
| D435,951 | S | 1/2001 | Yang et al. |
| 6,209,744 | B1 | 4/2001 | Gill |
| 6,211,637 | B1 | 4/2001 | Studer |
| 6,234,339 | B1 | 5/2001 | Thomasd |
| 6,250,492 | B1 | 6/2001 | Verbeek |
| D445,980 | S | 7/2001 | Tjugum |
| 6,286,706 | B1 | 9/2001 | Tucker |
| 6,328,320 | B1 | 12/2001 | Walski et al. |
| 6,345,725 | B1 | 2/2002 | Lin |
| 6,364,147 | B1 | 4/2002 | Meinzinger et al. |
| 6,386,386 | B1 | 5/2002 | George |
| 6,390,321 | B1 | 5/2002 | Wang |
| 6,401,958 | B1 | 6/2002 | Foss et al. |
| 6,519,130 | B1 | 2/2003 | Breslow |
| 6,557,716 | B1 | 5/2003 | Chan |
| 6,596,983 | B2 | 7/2003 | Brent |
| 6,626,316 | B2 | 9/2003 | Yang |
| 6,626,317 | B2 | 9/2003 | Pfiefer et al. |
| D482,169 | S | 11/2003 | Lin |
| 6,659,407 | B2 | 12/2003 | Asaro |
| 6,681,950 | B2 | 1/2004 | Miller, Jr. et al. |
| D488,604 | S | 4/2004 | Yang et al. |
| D488,903 | S | 4/2004 | Yang et al. |
| D489,503 | S | 5/2004 | Lin |
| D489,857 | S | 5/2004 | Yang et al. |

(56) References Cited

U.S. PATENT DOCUMENTS

| | | | |
|---|---|---|---|
| D490,583 | S | 5/2004 | Yang et al. |
| D490,954 | S | 6/2004 | Brand |
| D491,706 | S | 6/2004 | Yang et al. |
| 6,758,366 | B2 | 7/2004 | Bourgund et al. |
| D493,930 | S | 8/2004 | Wang |
| D494,723 | S | 8/2004 | Lin |
| 6,812,655 | B1 | 11/2004 | Wang et al. |
| 6,814,249 | B2 | 11/2004 | Lin |
| D499,450 | S | 12/2004 | Goodman et al. |
| 6,837,393 | B1 | 1/2005 | Kuo |
| 6,857,538 | B2 | 2/2005 | Lin |
| 6,859,005 | B2 | 2/2005 | Boliver |
| D503,021 | S | 3/2005 | Yang et al. |
| 6,866,826 | B2 | 3/2005 | Moore et al. |
| 6,883,676 | B2 | 4/2005 | Lin |
| D507,090 | S | 7/2005 | Yang et al. |
| 6,920,994 | B2 | 7/2005 | Lin |
| 6,974,948 | B1 | 12/2005 | Brent |
| D513,445 | S | 1/2006 | Lin |
| 6,981,606 | B2 | 1/2006 | Yang et al. |
| D517,764 | S | 3/2006 | Wang |
| D517,767 | S | 3/2006 | Yang et al. |
| D518,266 | S | 3/2006 | Yang et al. |
| 7,017,773 | B2 | 3/2006 | Gruber et al. |
| 7,044,323 | B2 | 5/2006 | Yang et al. |
| D525,756 | S | 7/2006 | Yang et al. |
| 7,073,677 | B2 | 7/2006 | Richardson et al. |
| 7,077,283 | B2 | 7/2006 | Yang et al. |
| 7,080,750 | B2 | 7/2006 | Wein et al. |
| 7,086,550 | B2 | 8/2006 | Yang et al. |
| D528,726 | S | 9/2006 | Lin |
| 7,121,421 | B2 | 10/2006 | Yang et al. |
| D531,499 | S | 11/2006 | Zaidman |
| D535,799 | S | 1/2007 | Epps |
| D535,800 | S | 1/2007 | Yang et al. |
| D537,223 | S | 2/2007 | Lin |
| D537,599 | S | 2/2007 | Lin |
| D537,601 | S | 2/2007 | Lin |
| D537,999 | S | 3/2007 | Lin |
| D538,995 | S | 3/2007 | Lin |
| D539,498 | S | 3/2007 | Yang et al. |
| D539,499 | S | 3/2007 | Yang et al. |
| D540,001 | S | 4/2007 | Zimmerman |
| D542,001 | S | 5/2007 | Yang et al |
| D542,995 | S | 5/2007 | Lin |
| D544,170 | S | 6/2007 | Lin |
| D544,171 | S | 6/2007 | Lin |
| D544,671 | S | 6/2007 | Saunders et al. |
| D545,024 | S | 6/2007 | Liao |
| 7,225,943 | B2 | 6/2007 | Yang et al. |
| D547,020 | S | 7/2007 | Chen |
| 7,243,811 | B1 | 7/2007 | Ramsey |
| D550,918 | S | 9/2007 | Wang et al. |
| D552,319 | S | 10/2007 | Gusdorf |
| D552,321 | S | 10/2007 | Yang et al. |
| D552,823 | S | 10/2007 | Yang et al. |
| D552,824 | S | 10/2007 | Zimmerman |
| D552,825 | S | 10/2007 | Yang et al. |
| D559,494 | S | 1/2008 | Yang et al. |
| D559,495 | S | 1/2008 | Yang et al. |
| 7,328,842 | B2 | 2/2008 | Wagner et al. |
| D564,169 | S | 3/2008 | Wang |
| D566,367 | S | 4/2008 | Lin |
| D566,369 | S | 4/2008 | Shek |
| D566,923 | S | 4/2008 | Lin |
| D568,572 | S | 5/2008 | Yang et al. |
| 7,374,060 | B2 | 5/2008 | Yang et al. |
| D571,520 | S | 6/2008 | Lin |
| 7,398,913 | B2 | 7/2008 | McClure |
| 7,404,499 | B1 | 7/2008 | Ramsey |
| D576,371 | S | 9/2008 | Zimmerman |
| D578,265 | S | 10/2008 | Presnell |
| D578,266 | S | 10/2008 | Yang et al. |
| D578,722 | S | 10/2008 | Yang et al. |
| 7,438,199 | B1 | 10/2008 | Tidrick |
| D580,120 | S | 11/2008 | Lin |
| D580,613 | S | 11/2008 | Yang et al. |
| D580,615 | S | 11/2008 | Yang et al. |
| D584,470 | S | 1/2009 | Bizzell et al. |
| D585,171 | S | 1/2009 | Bizzell et al. |
| D585,618 | S | 1/2009 | Yang et al. |
| 7,494,021 | B2 | 2/2009 | Yang et al. |
| 7,540,396 | B2 | 6/2009 | Yang et al. |
| 7,543,716 | B2 | 6/2009 | Lin |
| 7,559,433 | B2 | 7/2009 | Yang et al. |
| D599,074 | S | 8/2009 | Bizzell et al. |
| D603,119 | S | 10/2009 | Yang et al. |
| 7,607,552 | B2 | 10/2009 | Efstathiou |
| 7,621,420 | B2 | 11/2009 | Bandoh et al. |
| 7,656,109 | B2 | 2/2010 | Yang et al. |
| D611,216 | S | 3/2010 | Yang et al. |
| D611,217 | S | 3/2010 | Bizzell et al. |
| D611,671 | S | 3/2010 | Yang et al. |
| 7,694,838 | B2 | 4/2010 | Yang et al. |
| 7,703,622 | B1 | 4/2010 | Bynoe |
| D615,722 | S | 5/2010 | Yang et al. |
| 7,712,285 | B2 | 5/2010 | Stravitz et al. |
| 7,741,801 | B2 | 6/2010 | Fukuizumi |
| 7,748,556 | B2 | 7/2010 | Yang et al. |
| 7,781,995 | B2 | 8/2010 | Yang et al. |
| 7,806,285 | B2 | 10/2010 | Yang et al. |
| D631,221 | S | 1/2011 | Yang et al. |
| D632,864 | S | 2/2011 | Yang et al. |
| D634,911 | S | 3/2011 | Yang et al. |
| 7,896,187 | B2 | 3/2011 | Haibel |
| 7,922,024 | B2 | 4/2011 | Yang et al. |
| 7,950,543 | B2 | 5/2011 | Yang et al. |
| D644,390 | S | 8/2011 | Smeets et al. |
| 7,992,742 | B1 | 8/2011 | Kim |
| 8,006,857 | B2 | 8/2011 | Lin |
| D649,728 | S | 11/2011 | Campbell |
| 8,074,833 | B2 | 12/2011 | Yang et al. |
| 8,096,445 | B2 | 1/2012 | Yang et al. |
| 8,136,688 | B2 | 3/2012 | Lee et al. |
| D657,108 | S | 4/2012 | Yang et al. |
| D657,109 | S | 4/2012 | Liao |
| D672,520 | S | 12/2012 | Yang et al. |
| D675,802 | S | 2/2013 | Yang et al. |
| D675,803 | S | 2/2013 | Yang et al. |
| 8,418,869 | B2 | 4/2013 | Yang et al. |
| 8,567,630 | B2 | 10/2013 | Yang et al. |
| 8,569,980 | B2 | 10/2013 | Yang et al. |
| 8,672,171 | B2 | 3/2014 | Wynn et al. |
| 8,686,676 | B2 | 4/2014 | Yang et al. |
| 8,716,969 | B2 | 5/2014 | Yang et al. |
| 8,720,728 | B2 | 5/2014 | Yang et al. |
| 2001/0002690 | A1 | 6/2001 | Rosky |
| 2001/0020619 | A1 | 9/2001 | Pfeifer et al. |
| 2002/0092853 | A1 | 7/2002 | Wang |
| 2002/0096524 | A1 | 7/2002 | Hardesty |
| 2002/0104266 | A1 | 8/2002 | Ranaudo |
| 2003/0089719 | A1 | 5/2003 | Berger |
| 2003/0201265 | A1 | 10/2003 | Lin |
| 2003/0230576 | A1 | 12/2003 | Lin |
| 2004/0016756 | A1 | 1/2004 | Lin |
| 2004/0134924 | A1 | 7/2004 | Hansen et al. |
| 2004/0140782 | A1 | 7/2004 | Okabe et al. |
| 2004/0164077 | A1 | 8/2004 | Kuo |
| 2004/0174268 | A1 | 9/2004 | Scott et al. |
| 2004/0175303 | A1 | 9/2004 | Lin |
| 2004/0199401 | A1 | 10/2004 | Wagner |
| 2004/0200938 | A1 | 10/2004 | Forlivio |
| 2004/0206758 | A1 | 10/2004 | Lin |
| 2004/0206760 | A1 | 10/2004 | Gagnebin |
| 2004/0251746 | A1 | 12/2004 | Ichimaru et al. |
| 2005/0017006 | A1 | 1/2005 | Kuo |
| 2005/0017010 | A1 | 1/2005 | Siegel et al. |
| 2005/0133506 | A1 | 6/2005 | Yang et al. |
| 2005/0258794 | A1 | 11/2005 | Fukuizumi |
| 2006/0027579 | A1 | 2/2006 | Yang et al. |
| 2006/0103086 | A1 | 5/2006 | Niemeyer et al. |
| 2006/0175336 | A1 | 8/2006 | Wang |
| 2006/0186121 | A1 | 8/2006 | Yang et al. |
| 2006/0196874 | A1 | 9/2006 | Yang |

(56) References Cited

U.S. PATENT DOCUMENTS

| | | | |
|---|---|---|---|
| 2006/0249510 | A1 | 11/2006 | Lin |
| 2006/0278643 | A1 | 12/2006 | Chiou |
| 2007/0112699 | A1 | 1/2007 | Yang et al. |
| 2007/0034334 | A1 | 2/2007 | Ramsey et al. |
| 2007/0090112 | A1 | 4/2007 | Kalman et al. |
| 2007/0114847 | A1 | 5/2007 | Ichimaru et al. |
| 2007/0181579 | A1 | 8/2007 | Kuo et al. |
| 2007/0209846 | A1 * | 9/2007 | Wilson ........................ 180/65.1 |
| 2007/0241109 | A1 | 10/2007 | Lin |
| 2007/0266637 | A1 | 11/2007 | McGowan |
| 2007/0272691 | A1 | 11/2007 | Wang et al. |
| 2007/0289972 | A1 | 12/2007 | Wynn et al. |
| 2008/0011754 | A1 | 1/2008 | Ramsey |
| 2008/0011910 | A1 | 1/2008 | Ramsey |
| 2008/0083756 | A1 | 4/2008 | Daniels |
| 2008/0164257 | A1 | 7/2008 | Boll et al. |
| 2008/0236275 | A1 | 10/2008 | Breed et al. |
| 2008/0237234 | A1 | 10/2008 | Yang et al. |
| 2008/0257889 | A1 | 10/2008 | Kovacevich et al. |
| 2008/0257890 | A1 | 10/2008 | Kovacevich et al. |
| 2008/0257891 | A1 | 10/2008 | Kovacevich et al. |
| 2008/0264948 | A1 | 10/2008 | Kovacevich et al. |
| 2008/0264950 | A1 | 10/2008 | Kovacevich et al. |
| 2008/0272119 | A1 | 11/2008 | Efstathiou |
| 2008/0272127 | A1 | 11/2008 | Kovacevich et al. |
| 2009/0084788 | A1 | 4/2009 | Yang et al. |
| 2009/0194532 | A1 | 8/2009 | Yang et al. |
| 2009/0230131 | A1 | 9/2009 | McDuffie et al. |
| 2009/0261105 | A1 | 10/2009 | Cunningham et al. |
| 2009/0266836 | A1 | 10/2009 | Mobley |
| 2010/0006572 | A1 | 1/2010 | Chiou |
| 2010/0170904 | A1 | 7/2010 | Kalman et al. |
| 2010/0224627 | A1 | 9/2010 | Yang et al. |
| 2010/0237074 | A1 | 9/2010 | Yang et al. |
| 2010/0252557 | A1 | 10/2010 | Clements |
| 2010/0294769 | A1 | 11/2010 | Lee et al. |
| 2011/0139781 | A1 | 6/2011 | Jin et al. |
| 2011/0220646 | A1 | 9/2011 | Yang et al. |
| 2011/0220647 | A1 | 9/2011 | Yang et al. |
| 2011/0220648 | A1 | 9/2011 | Yang et al. |
| 2011/0220655 | A1 | 9/2011 | Yang et al. |
| 2011/0272409 | A1 | 11/2011 | Kasbohm |
| 2013/0233857 | A1 | 9/2013 | Yang et al. |
| 2013/0248532 | A1 | 9/2013 | Yang et al. |

FOREIGN PATENT DOCUMENTS

| | | | |
|---|---|---|---|
| CA | 132181 | | 6/2010 |
| CA | 136938 | | 5/2011 |
| CA | 141819 | | 4/2012 |
| CA | 146601 | | 2/2013 |
| CA | 152797 | | 4/2014 |
| CN | 102190144 | A | 9/2011 |
| CN | 301947175 | S | 6/2012 |
| CN | 201130284559.9 | | 6/2012 |
| CN | 103300590 | A | 9/2013 |
| CN | 201330418089.X | | 3/2014 |
| DE | 1610087 | | 6/1950 |
| DE | 1283741 | | 7/1966 |
| DE | 8436939 | | 3/1985 |
| DE | 9108341 | | 10/1991 |
| DE | 4225936 | A1 | 2/1994 |
| DE | 19525885 | | 3/1997 |
| DE | 19617823 | | 11/1997 |
| DE | 19809331 | | 5/1999 |
| DE | 29918687 | | 3/2000 |
| DE | 19933180 | | 1/2001 |
| DE | 10148997 | | 4/2003 |
| DE | 20217561 | | 3/2004 |
| EP | 0582240 | | 7/1993 |
| EP | 0903305 | A1 | 3/1999 |
| EP | 0906876 | | 4/1999 |
| EP | 1094017 | | 4/2001 |
| EP | 1361176 | | 11/2003 |
| EP | 1136393 | | 4/2004 |
| EP | 1447342 | A2 | 8/2004 |
| EP | 1600373 | A2 | 11/2005 |
| EP | 1647503 | A1 | 4/2006 |
| EP | 1686073 | | 8/2006 |
| EP | 1918223 | A1 | 5/2008 |
| EP | 1700799 | B1 | 8/2009 |
| EP | 001164826-0001 | | 9/2009 |
| EP | 001232904-0001 | | 10/2010 |
| EP | 001908575-0001 | | 8/2011 |
| EP | 001317416-0001 | | 4/2012 |
| EP | 001317416-0002 | | 4/2012 |
| EP | 001335285-0001 | | 7/2012 |
| EP | 001335293-0001 | | 7/2012 |
| EP | 001381636-001 | | 8/2013 |
| EP | 001381792-0001 | | 8/2013 |
| EP | 2636611 | A1 | 9/2013 |
| EP | 2636613 | A1 | 9/2013 |
| FR | 2887152 | | 12/2006 |
| GB | 191004921 | | 6/1910 |
| GB | 2384418 | | 7/2003 |
| JP | 02 152670 | | 6/1990 |
| JP | H06-56011 | | 8/1994 |
| JP | 06-272888 | | 9/1994 |
| JP | D1300450 | | 5/2007 |
| JP | D1300451 | | 5/2007 |
| JP | D1322056 | | 2/2008 |
| KR | 3003841370000 | | 6/2005 |
| KR | 3004095430000 | | 3/2006 |
| KR | 3004095430001 | | 7/2006 |
| NL | 6908550 | | 12/1970 |
| TW | D112733 | | 9/2006 |
| TW | D129485 | | 7/2009 |
| TW | D133382 | | 2/2010 |
| TW | D133678 | | 3/2010 |
| TW | D147147 | | 5/2012 |
| TW | D154797 | | 7/2013 |
| TW | D158187 | | 1/2014 |
| WO | WO 92/02430 | | 2/1992 |
| WO | WO 96/33671 | | 10/1996 |
| WO | WO 2005/080232 | A1 | 9/2005 |
| WO | WO 2006/079263 | | 8/2006 |
| WO | WO 2007/139570 | | 12/2007 |
| WO | WO 2009/114495 | | 9/2009 |

OTHER PUBLICATIONS

U.S. Appl. No. 29/411,491, filed Jan. 20, 2012, Yang et al.

U.S. Appl. No. 29/411,490, filed Jan. 20, 2012, Yang et al.

Trento Corner 23 Trash Can, Hailo product brochure, http://www.hailo.de/html/default.asp?site=12_71_107&lang=en, visited May 13, 2008.

U.S. Appl. No. 13/783,149, filed Mar. 1, 2013, Yang et al.

U.S. Appl. No. 29/447,313, filed Mar. 1, 2013, Yang et al.

U.S. Appl. No. 29/484,903, filed Mar. 13, 2014, Yang et al.

U.S. Appl. No. 29/484,764, filed Mar. 1, 2013, Yang et al.

U.S. Appl. No. 14/198,460, filed Mar. 5, 2014, Yang et al.

* cited by examiner

TRASH CANS WITH VARIABLE GEARING ASSEMBLIES

BACKGROUND

1. Field

The present disclosure relates to power transfer devices, such as mechanisms for operating lids or doors for refuse receptacles.

2. Description of the Related Art

Receptacles and other devices with mechanisms for transferring power to a subcomponent, such as a lid or a door, are used in a variety of different settings. For example, in both residential and commercial settings, trash cans and other devices often have lids for protecting or preventing the escape of the contents of the receptacle. In the context of trash cans, some trash cans include lids or doors to prevent odors from escaping and to hide the trash within the receptacle from view. Additionally, the lid of a trash can reduce the likelihood of contaminants escaping from the receptacle.

Some commercially available trash cans have power or manually operated lids. Such cans generally include a motor that drives a gear assembly, which in turn drives the lid open and closed. Such trash cans can include a sensor positioned on or near the lid. Such a sensor can be configured to detect movement, such as a user's hand being waived near the sensor, as a signal for opening the lid. When such a sensor is activated, a motor within the trash receptacle opens the lid or door and thus allows a user to place items into the receptacle. Afterwards, the lid can be automatically closed.

However, certain conventional power operated lids present some difficulties. For example, users of current trash cans with power operated lids can experience problems if the trash within the receptacle or can is piled higher than the level of the lid itself. If the trash or other material within the can is higher than the level of the lid itself, the lid will be unable to completely close. This can cause the motor or batteries to wear down, continue running, and/or ultimately fail. It can also force the user to reset the controller, remove trash, or manually compress the trash until the lid can be closed.

Additionally, design of certain conventional lids can result in increased stress on the motor and/or the gear assembly. For example, in the closed position, the lid is generally in a horizontal position (e.g., parallel with the ground), which can result in a relatively large initial moment of force (e.g., the force of gravity acting on the horizontal moment arm of the lid) that must be overcome by a motor or by a user to begin to open the lid. Such an initial moment of force can result in increased wear on the gear assembly and the motor, which can precipitate a failure of the motor, gear assembly, or both, or require can increased amount of opening force in a manual system.

Further, to overcome the moment of force when the lid is in the closed position, the motor of certain conventional receptacles is of a greater size (e.g., in power output) than otherwise would be required. However, increasing the size of the motor generally results in the motor having to consume additional power and/or requires larger exterior dimensions. A motor that consumes additional power may produce more heat and noise and/or require more frequent replacement of a power source (e.g., batteries). A motor having larger exterior dimensions can result in an increase in the overall dimensions of the receptacle or a reduction of the holding capacity of the receptacle. Increasing the overall dimensions of the receptacle can be undesirable because the receptacle occupies additional space (e.g., in already crowded kitchens or other environments). Reducing the capacity of the receptacle can be undesirable because certain items may no longer fit into the receptacle and/or because the receptacle may require more frequent emptying.

Moreover, so as to withstand the initial moment of force, the gears of certain conventional receptacles have a tooth diameter that is relatively small and generally constant. In some instances, this type of gear configuration can result in a reduced operating speed of the lid (e.g., the time for the lid to move from closed to open). Such a delay can be undesirable, for example, when a user is in a hurry.

Furthermore, the motor and/or gear assembly can be damaged when the lid is manually operated (e.g., not opened and/or closed by the motor). For example, when the lid is manually operated, certain of the gears in connection with the lid are encouraged to move (e.g., rotate and/or translate). However, because the motor may be relatively difficult to rotate when not being operated, the motor may inhibit one or more of the gears from moving. Thus, when the lid is manually operated, a stress can result between the gears that the lid is urging to move and the gears that the motor is inhibiting from moving. Such a stress can result in damage to the gears, motor, lid, or other components of the receptacle. For instance, such stress can strip one or more teeth of the gears. Damage to the gears can, for example, result in reduced control over the motion of the lid, cause noise, and even inhibit or prevent the motor from operating the lid.

SUMMARY OF THE DISCLOSURE

Several embodiments of refuse receptacles, such as trash cans, are disclosed. According to some embodiments, a refuse receptacle includes an outer shell component portion and a lid mounted relative to the outer shell component portion and configured to move between an open position and a closed position. Some embodiments also include a power supply and a motor configured to be powered by the power supply. Certain variants have a gear assembly that is configured to move the lid between the opened and closed positions. The gear assembly can include a variable gear rotatably engaged with a lifting gear. Some variants of the variable gear are rotatable by the motor and have a first tooth and a second tooth. The first tooth can have a first tooth radius and the second tooth can have a second tooth radius. The second tooth radius can be greater than the first tooth radius. In some embodiments, rotation of the variable gear facilitates acceleration in the angular velocity of the lid during the movement of the lid between the opened and closed positions.

In some embodiments, the variable gear comprises a plurality of teeth, each with a tooth radius. In certain implementations, a plurality of teeth have a unique tooth radius. The tooth radii generally increase and/or decrease in succession around the circumference of the variable gear. In certain embodiments, the tooth having the longest tooth radius is engaged with the lifting gear when the lid is in the open position. In some embodiments, the tooth having the shortest tooth radius is engaged with the lifting gear when the lid is in the closed position. One or more teeth positioned in between these teeth have radii in between the longest and shortest tooth radii.

In certain variants, the lifting gear comprises a rack gear having a first transverse width and a second transverse width. The first transverse width can be different than the second transverse width. In some embodiments, during movement of the lid between the opened and closed positions, at least one tooth of the variable gear is engaged with at least one tooth of the rack gear. The sum of the tooth radius and the transverse width of the engaged teeth can increase, decrease, or be generally constant.

In some embodiments, a receptacle can comprise a coupling mechanism configured to inhibit vibration from the motor from being transmitted to the variable gear.

Some implementations have a drive shaft that is rotated by the motor. The drive shaft can have a first portion with a first cross-sectional shape (e.g., generally round) and a second portion having a second cross-sectional shape (e.g., generally rectangular). The first and second cross-sectional shapes can be non-complementary.

Some embodiments include a clutch member configured to engage with the variable gear. The variable gear can have a first interface surface, such as an inclined cam surface, and the clutch member can include a corresponding second interface surface, such as an inclined cam surface, configured to nest with the first inclined cam surface. In some embodiments, wherein the lid is disposed generally parallel with the ground on which the receptacle is located in the closed position. In some embodiments, the lid is disposed generally perpendicular to the ground in the open position.

In certain implementations, a trash can, which is configured for manual and/or powered operation, can include an outer shell component and a lid mounted relative to the outer shell component and configured to move between an open position and a closed position. Some embodiments also include a power supply and a motor configured to be powered by the power supply. In some embodiments, a gear assembly is operably connected with the motor and the lid, or between a manually-operated device (e.g., a pedal) and the lid, such that powered operation of the motor can drive the lid between the open and closed positions via the gear assembly. Certain embodiments have a clutch engaged with the gear assembly. The clutch can be configured to transmit torque from the motor to a portion of the gear assembly during powered operation of the lid by the motor. The clutch can be configured to at least partly disengage from the gear assembly during manual operation of the lid to allow the at least part of the gear assembly to rotate relative to the clutch, thereby facilitating manual operation of the lid without damage to the gear assembly.

According to some embodiments, after manual operation of the lid has ceased, the clutch is automatically reengaged with the gear assembly, thereby facilitating subsequent powered operation of the lid. Certain variants have a biasing member configured to bias the clutch into engagement with the gear assembly. Some implementations have a drive shaft and the clutch is configured to translate along a portion of the drive shaft.

In some embodiments, the gear assembly further comprises a first inclined cam surface and the clutch member comprises a corresponding second inclined cam surface configured to nest with the first inclined cam surface. In certain variants, during manual operation of the lid, the first and second inclined cam surfaces slide relative to each other. In some embodiments, during manual operation of the lid, the clutch is urged in a direction generally away from the motor.

BRIEF DESCRIPTION OF THE DRAWINGS

The above-mentioned and other features of the trashcans disclosed herein are described below with reference to the drawings of certain embodiments. The illustrated embodiments are intended to illustrate, but not to limit the disclosure. The drawings contain the following Figures.

DETAILED DESCRIPTION OF CERTAIN EMBODIMENTS

Certain embodiments of a system for opening and closing a lid or door of a refuse receptacle (e.g., a trash can) or other device are disclosed. The present disclosure describes certain embodiments in the context of a domestic trash can, due to particular utility in that context. However, the subject matter of the present disclosure can be used in many other contexts as well, such as commercial trash cans, doors, windows, security gates, and other larger doors or lids, as well as doors or lids for smaller devices, such as high precision scales, computer drives, etc. The embodiments and/or components thereof can be implemented in powered or manually-operated systems.

Figure 1:
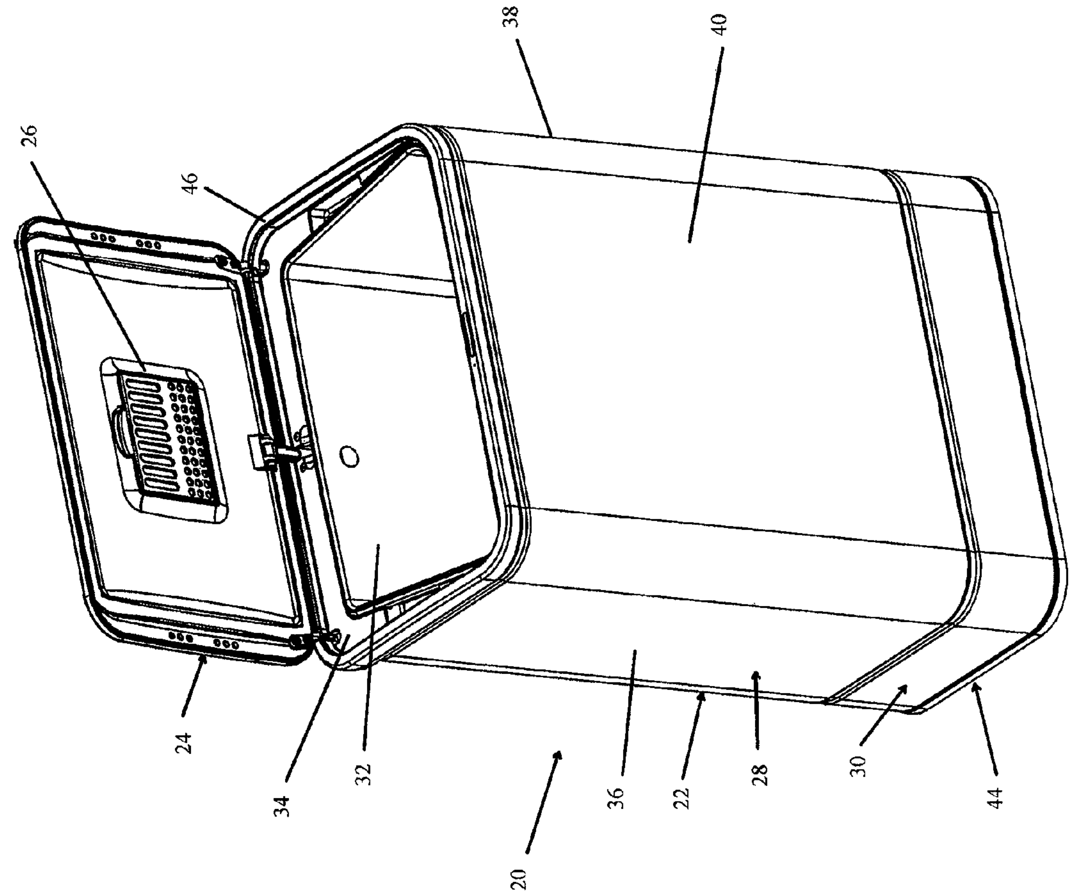
FIG. 1 illustrates a top, front, and right side perspective view of an embodiment of an enclosed receptacle, with its lid opened.
Figure 2:
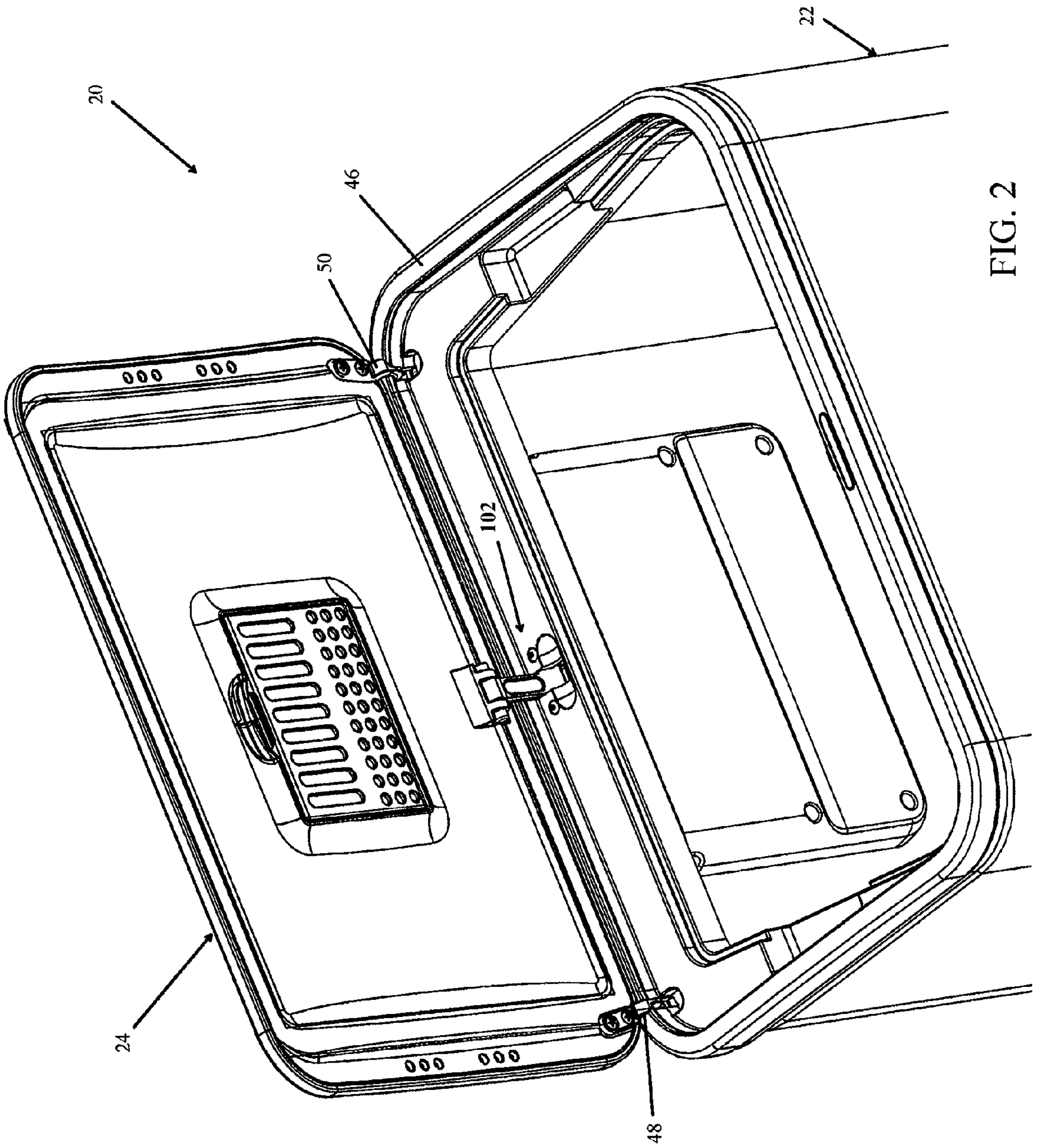
FIG. 2 illustrates an enlarged top, front, and right side perspective view of the receptacle illustrated in FIG. 1.

With reference to FIGS. 1 and 2, a trash can assembly 20 can include an outer shell component 22 and lid 24. The lid 24 can include door components 26, such as an air filter. The trash can assembly 20 can be configured to rest on a floor, and can be of varying heights and widths depending on, among other things, consumer need, cost, and ease of manufacture. Additional details and examples of trash can assemblies that can be used with, or instead of, components discussed herein are provided in U.S. Patent Application Publication No. 2011/0220647, filed Mar. 4, 2011, the entirely of which is incorporated herein by reference.

Some embodiments of the outer shell component 22 include an upper shell portion 28 and lower shell portion 30. Some embodiments of the trash can assembly 20 comprise an inner liner 32 configured to be retained within the outer shell component 22. For example, an upper peripheral edge of the outer shell component 22 can be configured to support an upper peripheral edge of inner liner 32, such that the inner liner 32 is suspended by its upper peripheral edge within the outer shell component 22. In some embodiments, the trash can assembly 20 can include a liner support member 34 supported by the shell component 22 and configured to support the liner 32 within the interior of the outer shell component 22. In certain embodiments, the inner liner 32 is positioned near, or seated on, a lower portion of the outer shell component 22.

Figure 3:
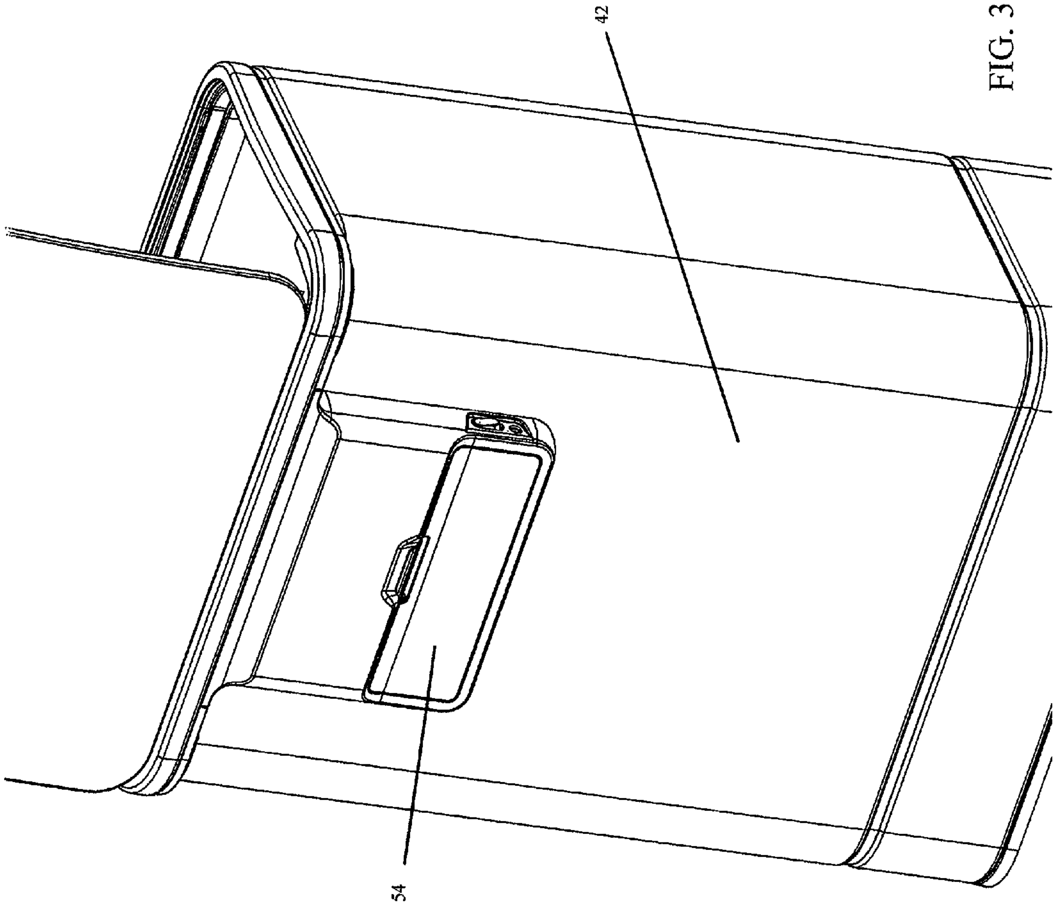
FIG. 3 illustrates a top, rear, right side perspective view of the receptacle shown in FIG. 1.

The outer shell component 22 can have any configuration. As shown in FIG. 1, the outer shell component 22 can have a generally rectangular cross sectional configuration with sidewalls 36, 38, a front wall 40, and a rear wall 42 (FIG. 3). The inner liner 32 can have a shape that generally compliments the shape defined by the outer shell component 22. However, other configurations can also be used. The upper and lower shell portions 28, 30 can be made from plastic, steel, stainless steel, aluminum or any other material.

The trash can assembly 20 can include a base portion 44. The base portion 44 can include screws or other components for attachment to the outer shell component 22, and can have a flat lower portion for resting on a surface, such as a kitchen floor. The base portion 44 of the trash can assembly 20 can be made integrally, monolithically, or separate from the outer shell component 22. Thus, the base portion 44 can be made from any material including plastic, steel, stainless steel, aluminum or any other material. Additionally, in some embodiments, such as those in which the outer shell component 22 is metal (e.g., stainless steel), the base portion 44 can be a plastic material.

The lid 24 can be pivotally attached to the trash can assembly in any manner. For example, in the illustrated embodiment, the lid 24 is pivotally attached to an upper lid support ring 46, which can be securely mounted to the upper periphery of the outer shell component 22. In some embodiments, the lid 24 is connected with hinges 48, 50, which can be constructed in any manner. The trash can assembly can include a lifting mechanism 102, such as a gearing and/or linkage assembly, which can be used to move the lid 24 between open and closed positions, as will be discussed in further detail below.

Figure 4:
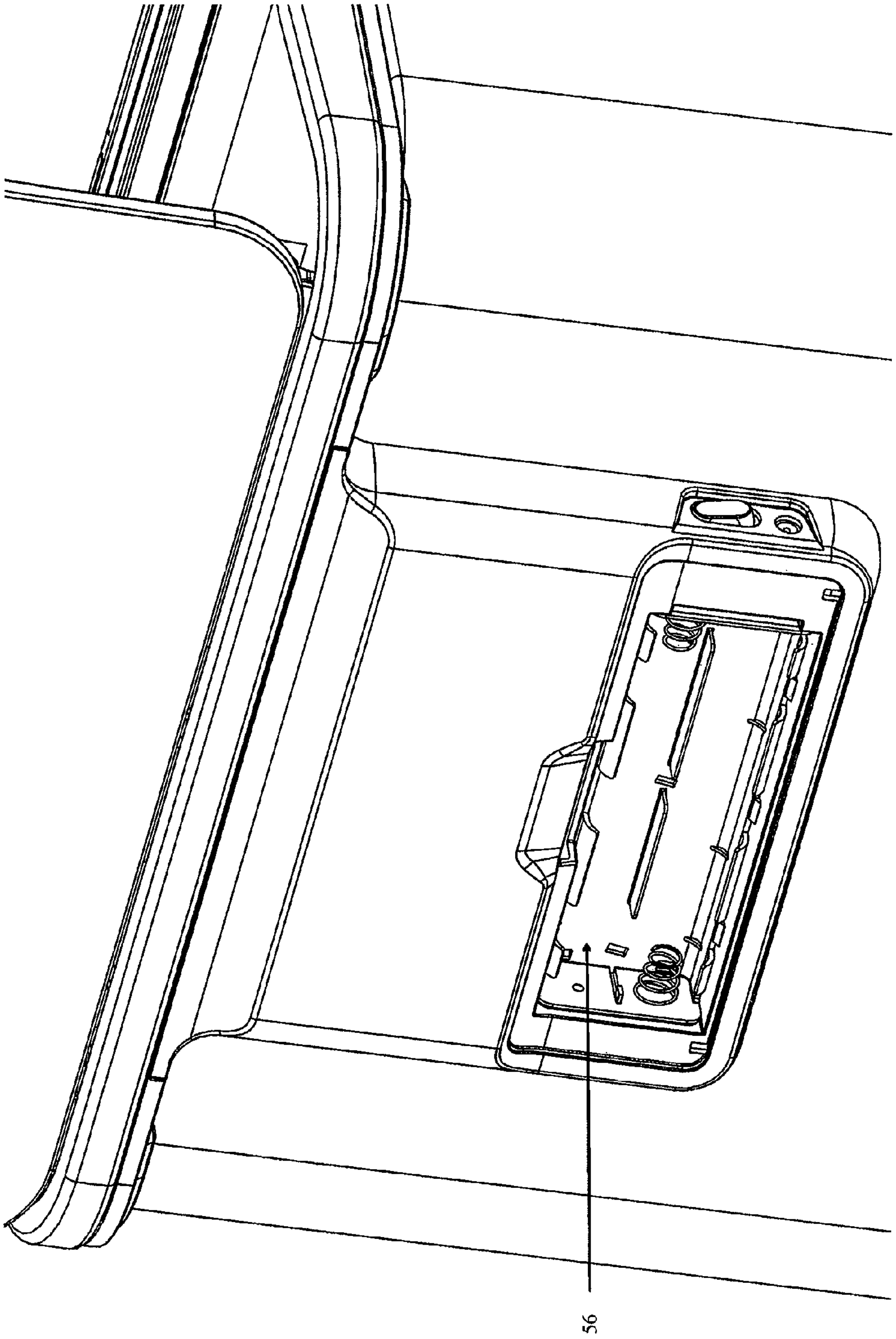
FIG. 4 illustrates an enlarged top, rear, right side perspective view of the receptacle shown in FIG. 1, with a back cover removed.

With reference to FIGS. 3 and 4, and as described above, the trash can 20 can include the rear wall 42. Along the rear wall 42, the trash can 20 can include a back cover 54. The back cover 54 can enclose and/or protect a back side enclosure 56. The back side enclosure 56 can house the power source for the trash can 20. For example, in some embodiments, the back side enclosure 56 can be configured to receive and retain at least one battery. In some embodiments, the battery can be rechargeable type that can be recharged. In some embodiments, the trash can 20 can by powered by plugging into a power source, such as a common household electric outlet. In some embodiments, the back side enclosure 56 houses a motor (e.g., an electric motor). In some embodiments, the portion of the power system (e.g., the battery compartment or motor) that extends beyond the outside of the exterior (e.g., the rear exterior) of the receptacle has a low-profile design. For example, the distance between the adjacent rear portion of the exterior of the receptacle and the rear portion of the power system component can be less than or equal to about 2 inches or about 3 inches, or less than or equal to about the width of the upper lid support surface 46, or less than or equal to about twice the width of the upper support surface 46.

As previously noted, in some embodiments, the trash can assembly includes a lifting mechanism 102, such as is depicted in FIGS. 5-9. The lifting mechanism 102 can include a drive motor 112 that drives a drive shaft 120. In some embodiments, the lifting mechanism 102 includes a coupling mechanism 111, which can transfer power between the motor 112 and the drive shaft 120, as will be discussed in further detail below. In some embodiments, the motor 112 rotates a variable gear 124 (e.g., via the coupling mechanism 111 and the drive shaft 120), which causes a lifting member 106 to pivotably open the lid 24. As shown, certain embodiments of the variable gear 124 and the lifting member 106 are cooperatively engaged, such as in a rack and pinion assembly.

Figure 5:
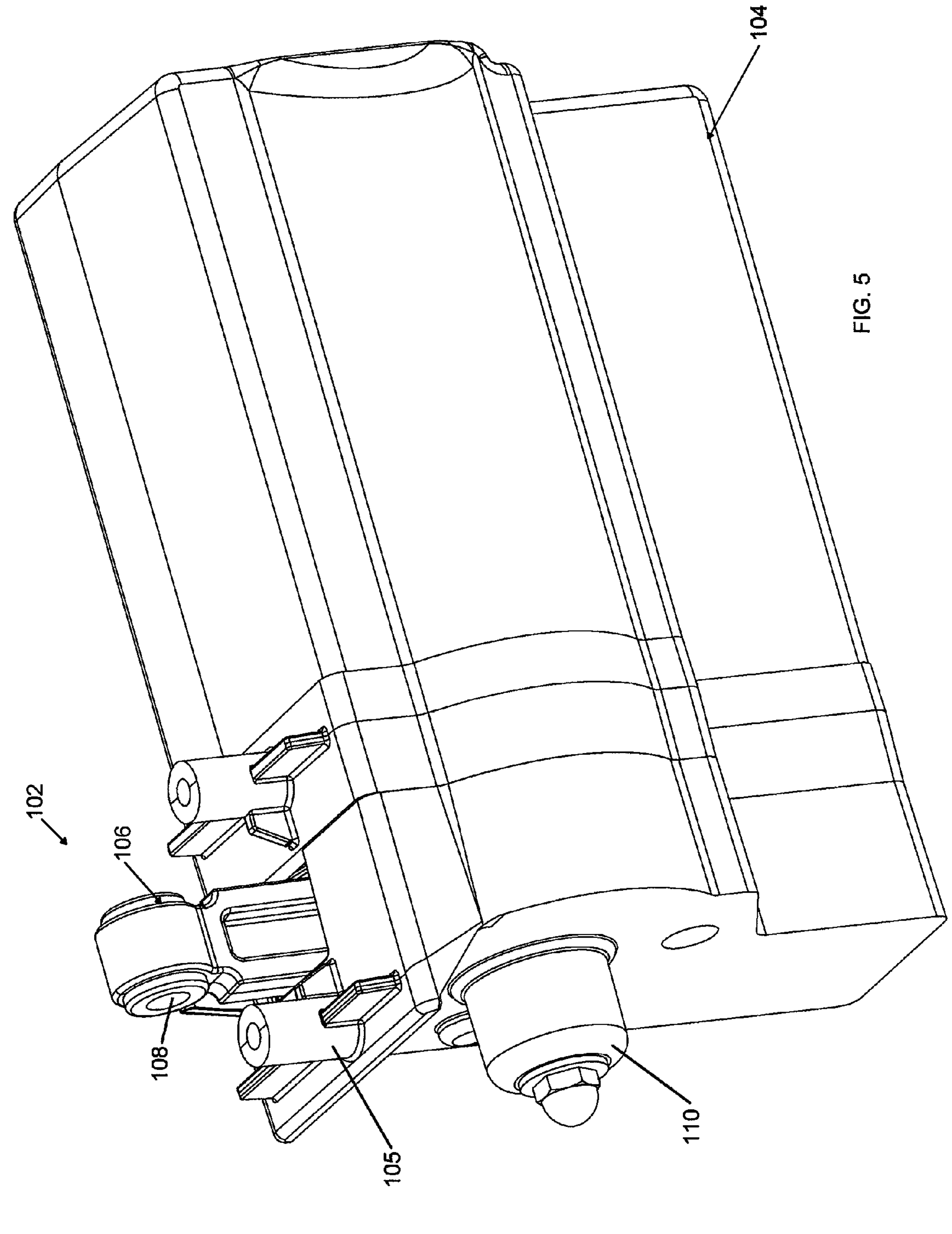
FIG. 5 illustrates a perspective view of an embodiment of a lifting mechanism, including a housing portion.
Figure 6:
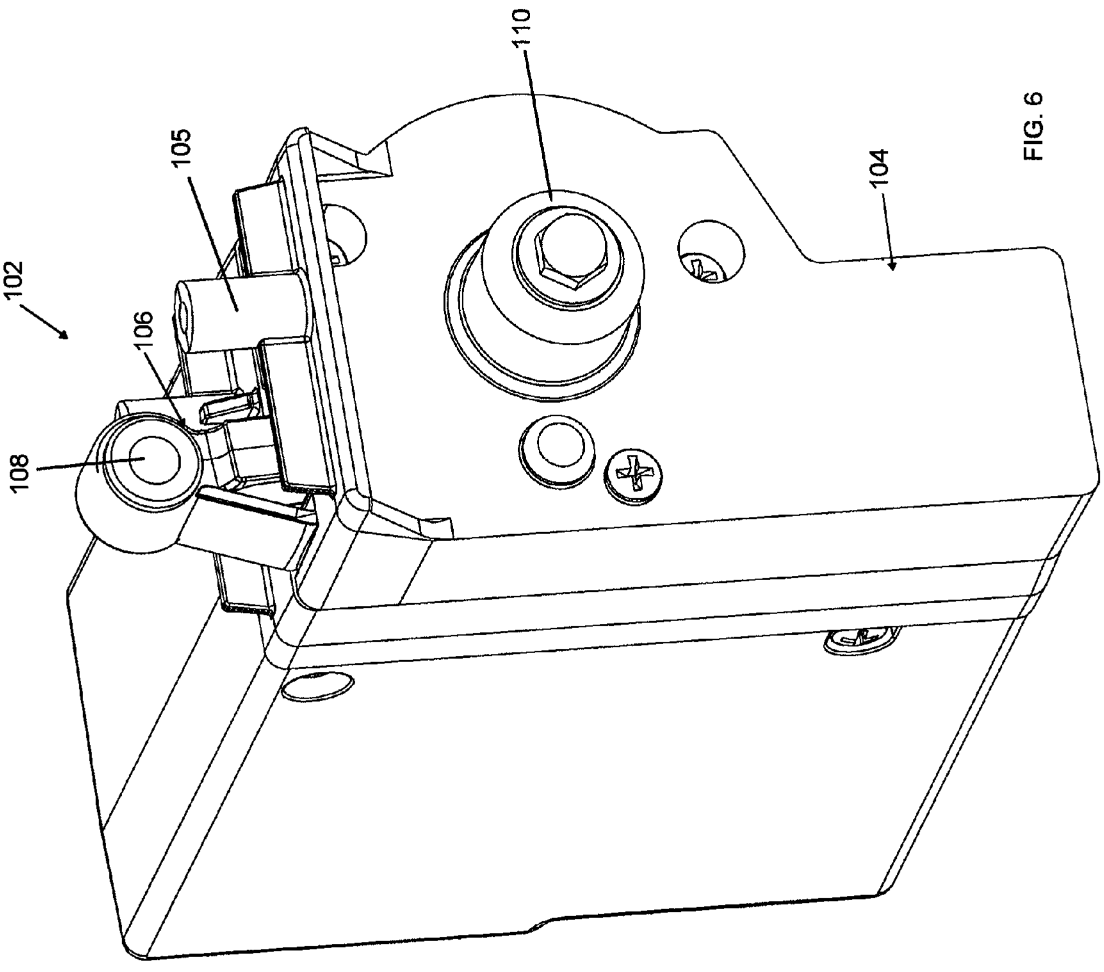
FIG. 6 illustrates another perspective view of the lifting mechanism of FIG. 5.

As depicted in FIGS. 5 and 6, a portion of the lifting mechanism 102 can be received in a housing portion 104. The housing portion 104 can comprise plastic, steel, stainless steel, aluminum or any other suitable material. As shown in the exploded view of the lifting mechanism 102 in FIG. 9, the housing portion 104 can comprise two or more components, which can be held together by screws or by any other suitable manner (e.g., ultrasonic or thermal welding, etc.). The housing portion 104 can comprise various shapes and configurations. For example, the housing portion 104 can have a flat surface portion that abuts the rear wall 42 of the trash can assembly 20. In certain variants, the housing portion 104 projects outward from the rear wall 42. In some embodiments, the housing 104 is partially positioned inside the trash can assembly 20, so that the housing 104 does not extrude far from the periphery of the trash can assembly 20. In some implementations, the housing portion 104 is located inside the trash can assembly 20 or on any other position on the trash can assembly 20. In some embodiments, substantially all the moving components of the lifting mechanism 102 are contained within the housing 104. Should there be a failure in operation of the trash can 20 (e.g., a failure of the lifting mechanism 102), the housing 104 can be removed for inspection or replacement.

In some embodiments, the housing portion 104 can be configured to generally enclose the lifting mechanism 102. In some embodiments, the housing portion 104 has one or more openings through which a portion of the lifting mechanism 102 can extend. For example, as shown in FIGS. 5 and 6, a linkage attachment member, such as an eyelet portion 108, of the lifting member 106 can extend through an opening of the housing portion 104. Such a configuration can, for example, allow the eyelet portion 108 to connect with the lid 24 directly or indirectly (e.g., via an intermediate linkage (not shown)). In some embodiments, a pin can be removably inserted through the eyelet portion 108 as a portion of the lid 24 to connect the two. As shown, certain embodiments include one or more protection members, such as doors, which can be opened by the lifting member 106 and closed by force of gravity. The housing portion 104 may include one or more connection members, such as flanges 105, that connect the housing portion 104 to the lid 24, the outer shell component 22, or other portions of the trash can assembly 20.

Figure 7:
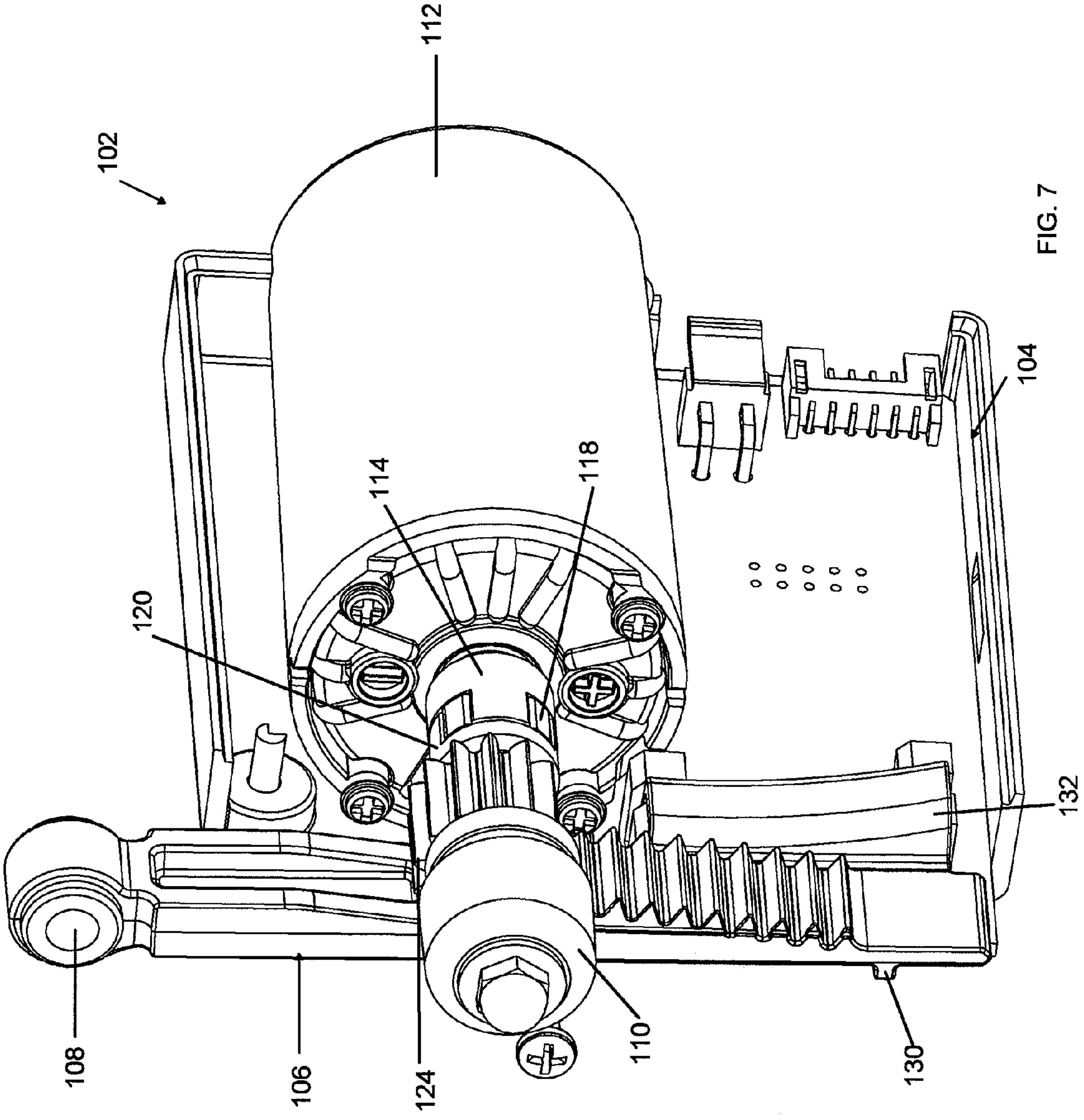
FIG. 7 illustrates a perspective view of the lifting mechanism of FIG. 5 with a portion of the housing portion removed.
Figure 8:
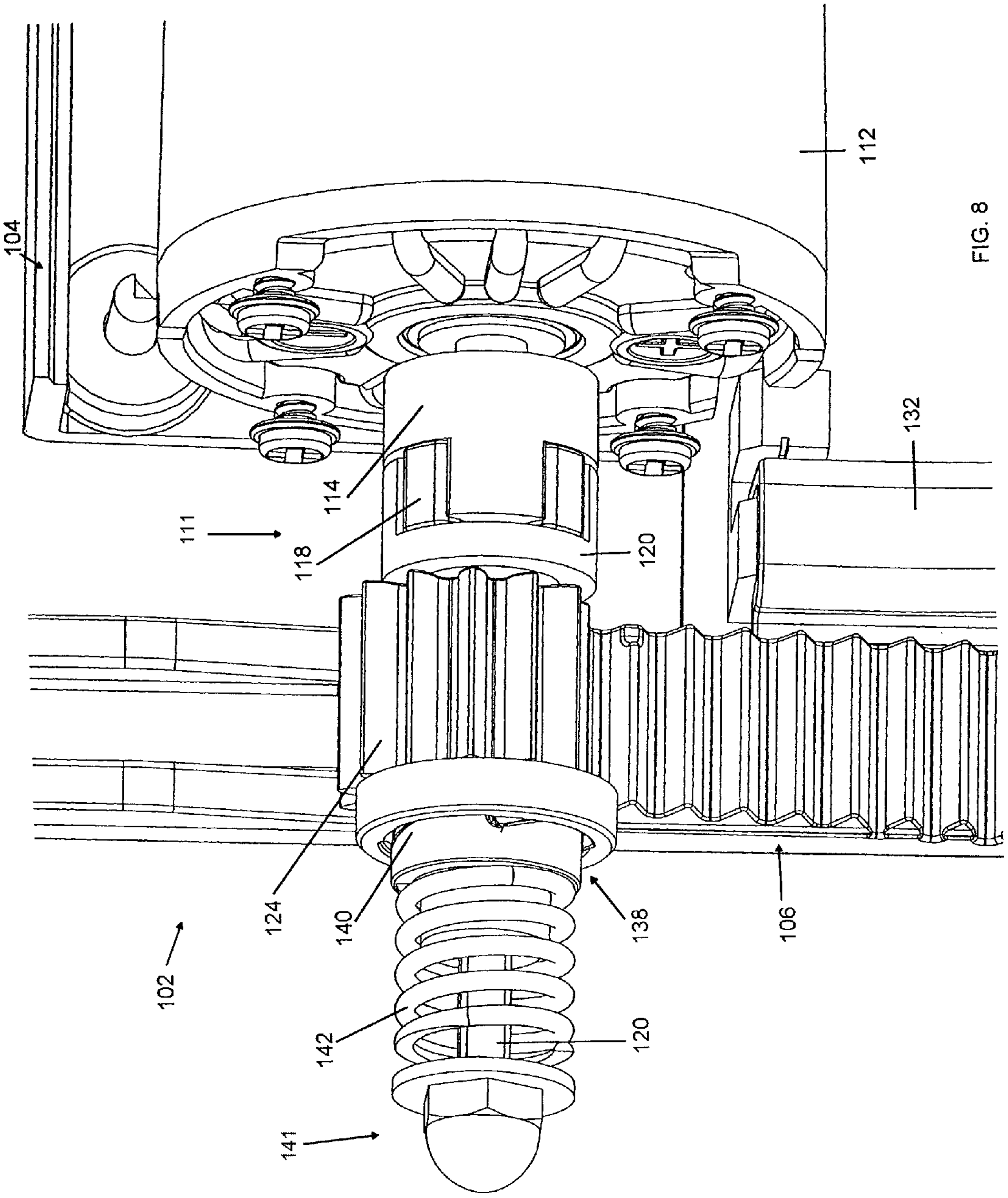
FIG. 8 illustrates an enlarged perspective view of the lifting mechanism of FIG. 5 with a portion of the housing portion and the spring mandrel removed.
Figure 9:
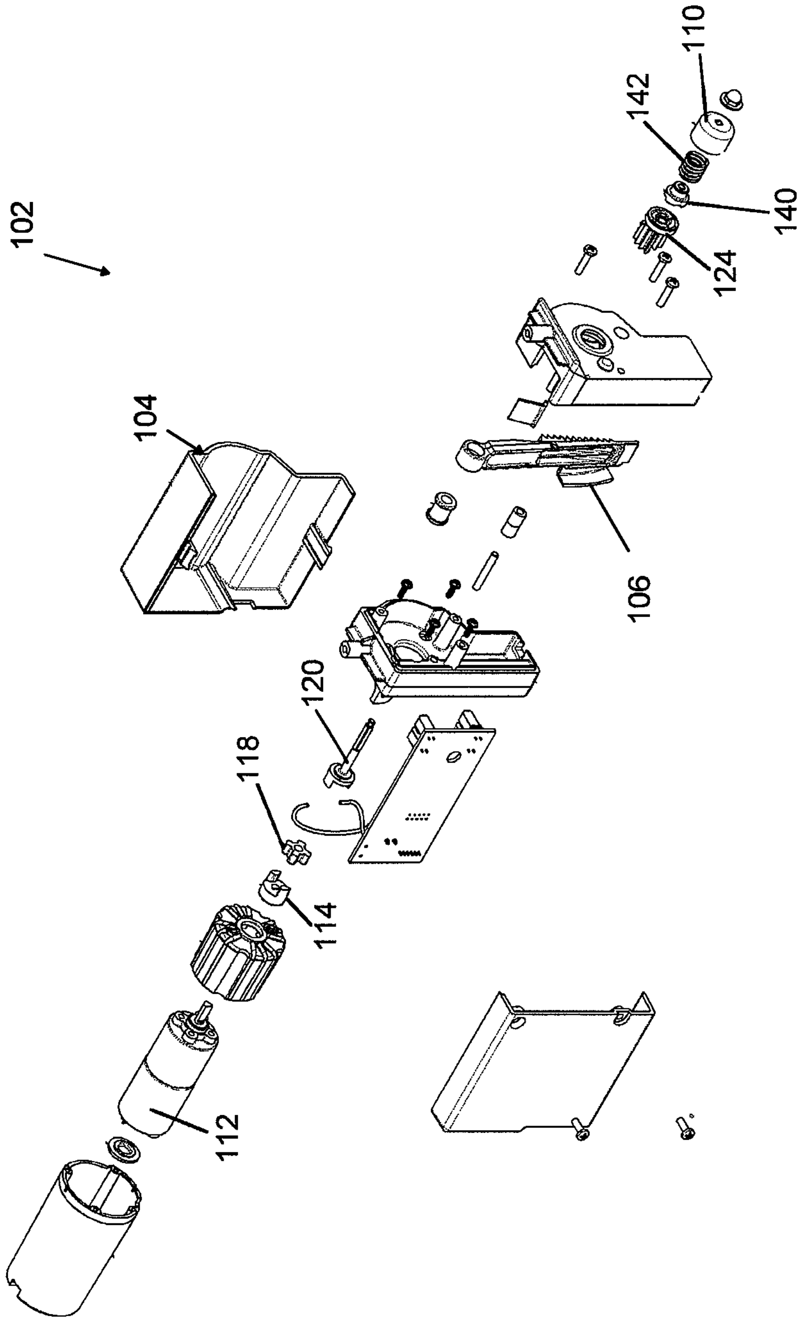
FIG. 9 illustrates an exploded view of the lifting mechanism of FIG. 5, including a coupling member, coupling spider, drive shaft, variable gear, lifting member, and clutch member.

As shown in FIGS. 7 and 8, a portion of a drive shaft 120 can extend out of the housing portion 104. In some embodiments, a cover portion, such as a mandrel 110, protects the portion of the lifting mechanism 102 extending out of the housing portion 104. The mandrel 110 can comprise plastic, steel, stainless steel, aluminum or any other suitable material.

In some embodiments, the motor 112 directly drives the variable gear 124. In certain implementations, the motor 112 is configured to indirectly drive the variable gear 124. For example, the coupling mechanism 111, drive shaft 120, and/or a clutch member 140 can be positioned so as to transmit driving force to the variable gear 124. In some embodiments, the motor 112 can drive the coupling mechanism 111, which can drive the drive shaft 120, which can drive the clutch member 140, which can drive the variable gear 124. In some embodiments, an output shaft of the motor 112 can connect to the drive shaft 120 directly. In some embodiments, the coupling mechanism 111 is positioned intermediate, and connects, the drive shaft 120 and the motor 112.

Figure 10:
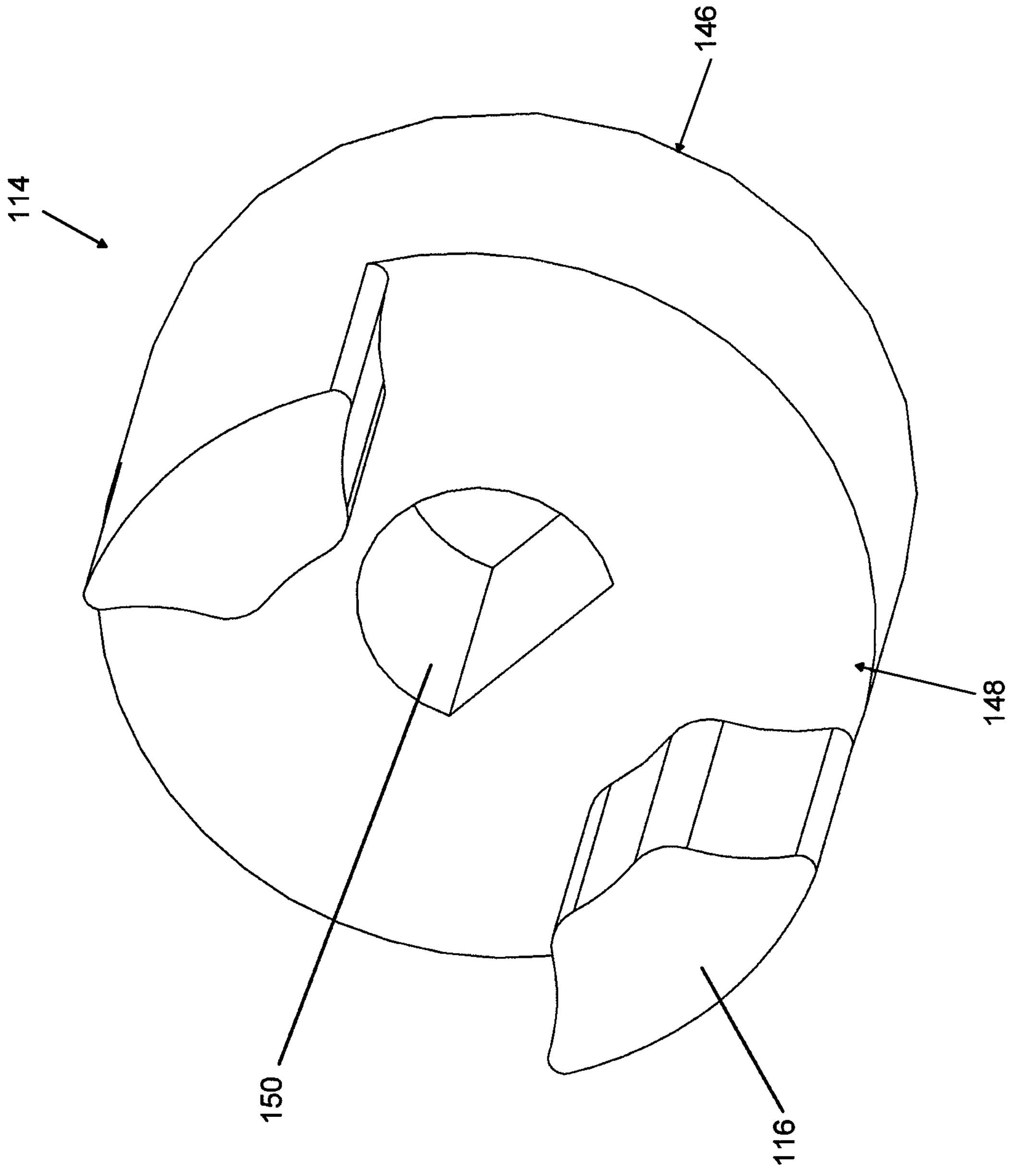
FIG. 10 illustrates a perspective view of a shaft-side surface of the coupling member of FIG. 9.

In several embodiments, the coupling mechanism 111 includes a first coupling member 114. The first coupling member 114 can include a generally flat first side 146, which can be configured to generally face toward the motor 112. As shown in FIG. 10, certain embodiments of the first coupling member 114 have a second side 148, which can include one or more torque transmission members, such as pegs 116 that extend from the second side 148. Some embodiments of the first coupling member 114 can include an opening 150 (e.g., a generally "D" shaped aperture) through which the output shaft (e.g., a generally "D" shaped shaft) of the motor 112 can be received. As illustrated, the shape of the opening 150 on the first coupling member 114 can correspond to the shape of the output shaft of the motor 112. The first coupling member 114 can comprise glass, plastic, aluminum, stainless steel, hard rubber, or any other suitable material.

Figure 11:
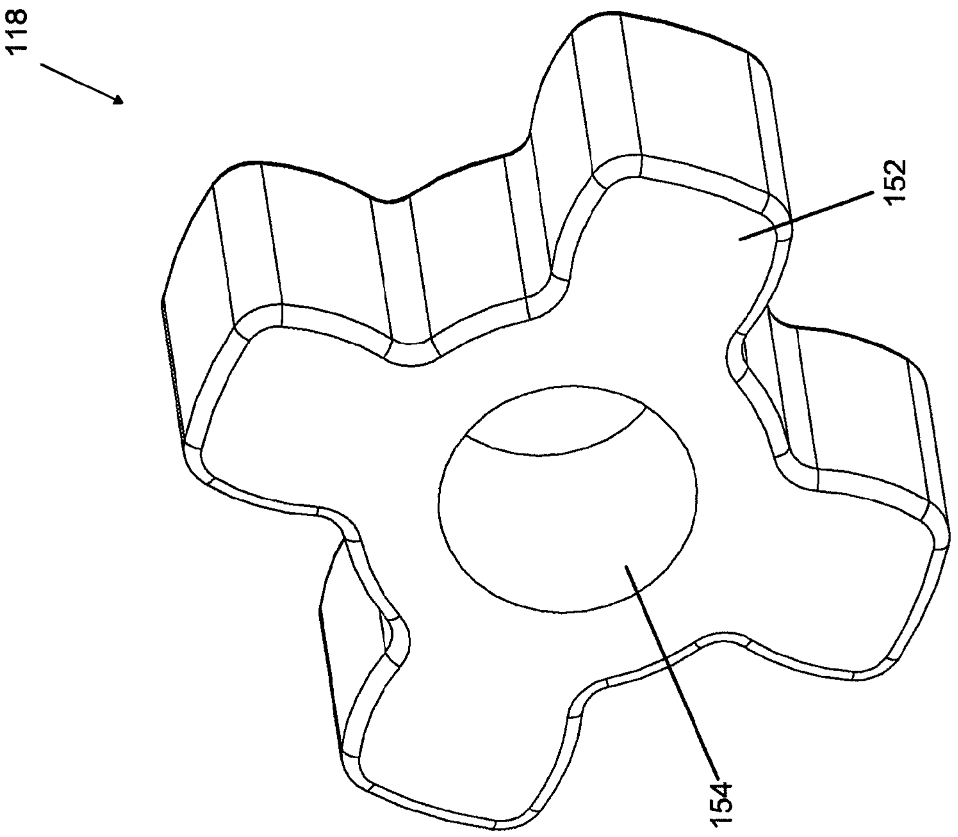
FIG. 11 illustrates a perspective view of the coupling spider of FIG. 9.

In some embodiments, the coupling mechanism 111 includes a second coupling member 118. In some implementations of the coupling mechanism 111, the second coupling member 118 is positioned between the first coupling member 114 and the drive shaft 120. The second coupling member 118, as depicted in FIG. 11, can include one or more torque transmission elements, such as arms 152, generally around the circumference of the second coupling member 118 and an opening 154 (e.g., for at least some of the output shaft of the motor 112 to extend at least partly through). In certain implementations, the second coupling member 118 can be positioned near or against the shaft side surface 148 of first coupling member 114. Some embodiments have at least one of the pegs 116 of the first coupling member 114 located generally between at least two adjacent arms 152 of the second coupling member 118.

In some embodiments, the first coupling member 114 is operably connected with the motor 112 and the second coupling member 118. For example, in some variants, the motor 112 can rotate the first coupling member 114, which in turn can rotate the second coupling member 118. The second coupling member 118 can be configured to dampen undesirable transmissions (e.g., noise, vibration, and/or harshness) produced by the motor 112 that are transmitted to the second coupling member 118 via the first coupling member 114. For example, the second coupling member 118 can be made of rubber, plastic, or other generally damping, pliable, or resilient materials.

Figure 12:
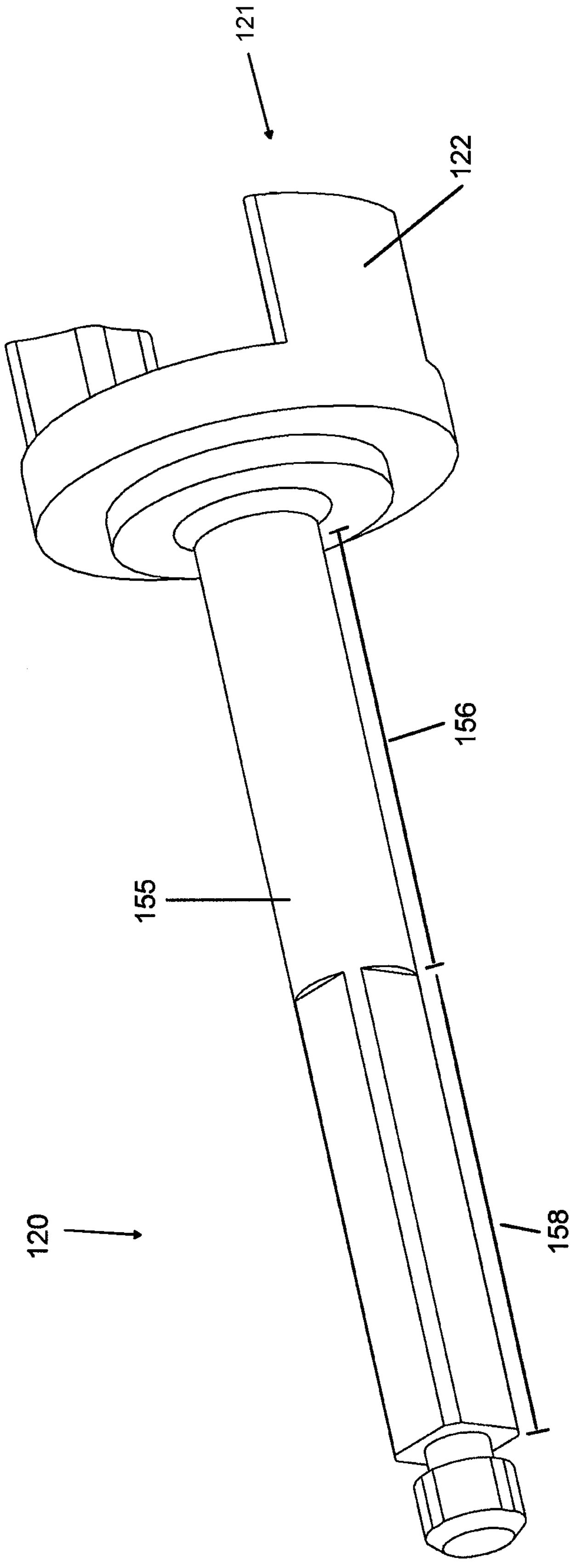
FIG. 12 illustrates a perspective view of the drive shaft of FIG. 9.

FIG. 12 depicts an embodiment of a drive shaft 120. A first side 121 of the drive shaft 120 can include one or more torque transmitting elements, such as protrusions 122. In some variants, one or more of the protrusions 122 can be configured to fit generally between at least two of the arms 152. In some configurations, the first side 121 is positioned near or abutting the second coupling member 118.

The first coupling member 114, second coupling member 118, and drive shaft 120 can be axially aligned and fit together to form a generally cylindrical structure (see FIGS. 7 and 8). In certain embodiments, when the motor 112 turns the first coupling member 114, the first coupling member 114 turns the second coupling member 118, which in turn drives the drive shaft 120. As shown, certain embodiments have at least one of the arms 152 of the second coupling member 118 between each of the protrusions 122 of the drive shaft 120 and/or the pegs 116 of the first coupling member 114. Further, in some embodiments, the first coupling member 114 and the driving member 120 are axially spaced apart (e.g., by the second coupling member 118). As previously noted, the second coupling member 118 can be configured to reduce, or dampen, the transmission of vibration and the like produced by the motor 112. Thus, in certain embodiments, the second coupling member 118 can dampen, or at least reduce, the transmission of such vibrations and the like into the drive shaft 120 and/or variable gear 124, and consequently to the lid 24, to reduce rocking of the lid 24, or otherwise.

Certain embodiments of the drive shaft 120 include an extension portion 155 extending in a generally opposite direction from the protrusions 122. In some embodiments, the extension portion 155 can include a first shaft region 156 and a second shaft region 158. In some embodiments, the regions 156, 158 have a different transverse cross-section. For example, the transverse cross-section of the first shaft region 156 can be circular and the transverse cross-section of second shaft region 158 can be generally square-shaped. The transverse cross-section of the shaft regions 156, 158 can have other shapes, such as generally elliptical, pentagonal, hexagonal, star-shaped, or otherwise. The drive shaft 120 can comprise glass, plastic, aluminum, stainless steel, or any other suitable material.

Figure 13:
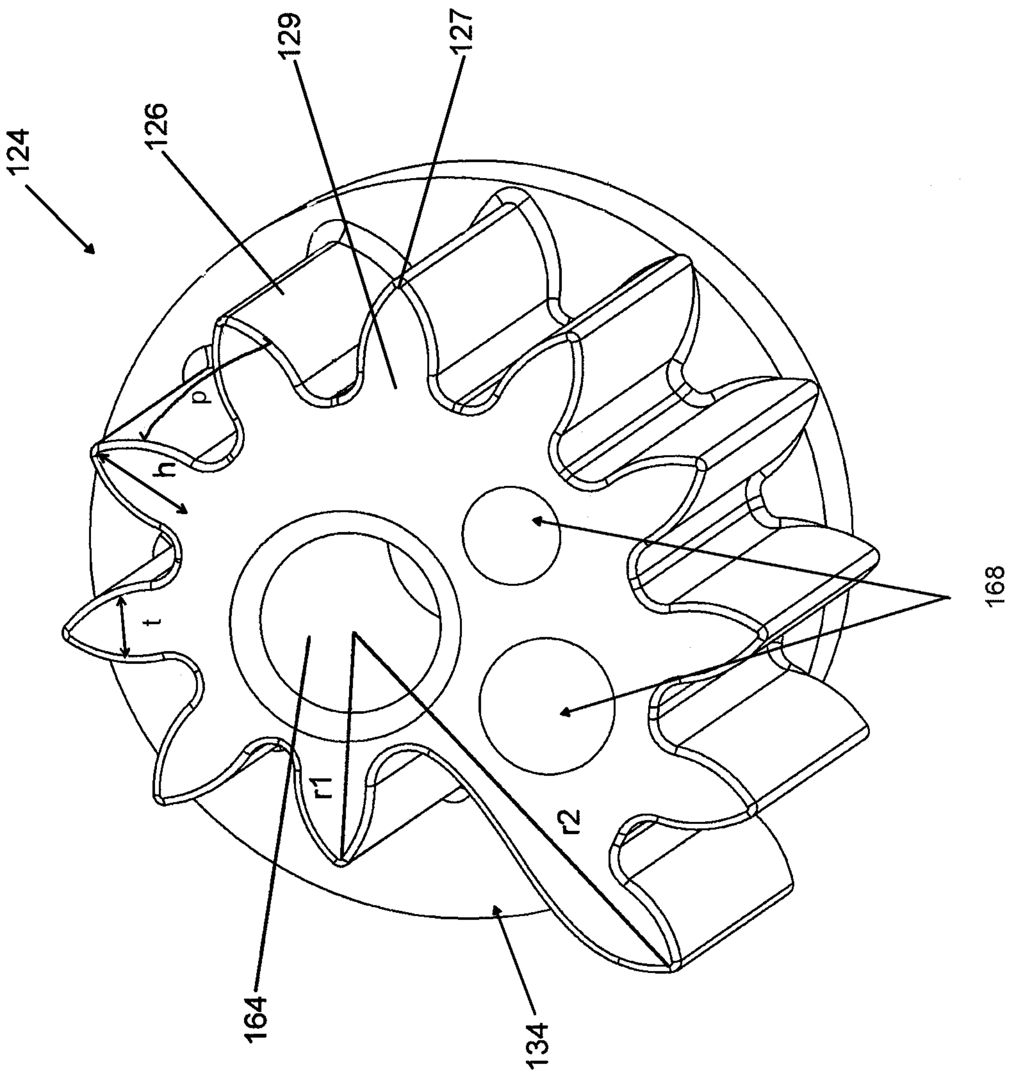
FIG. 13 illustrates a perspective view of a pinion gear surface of the variable gear of FIG. 9.
Figure 14:
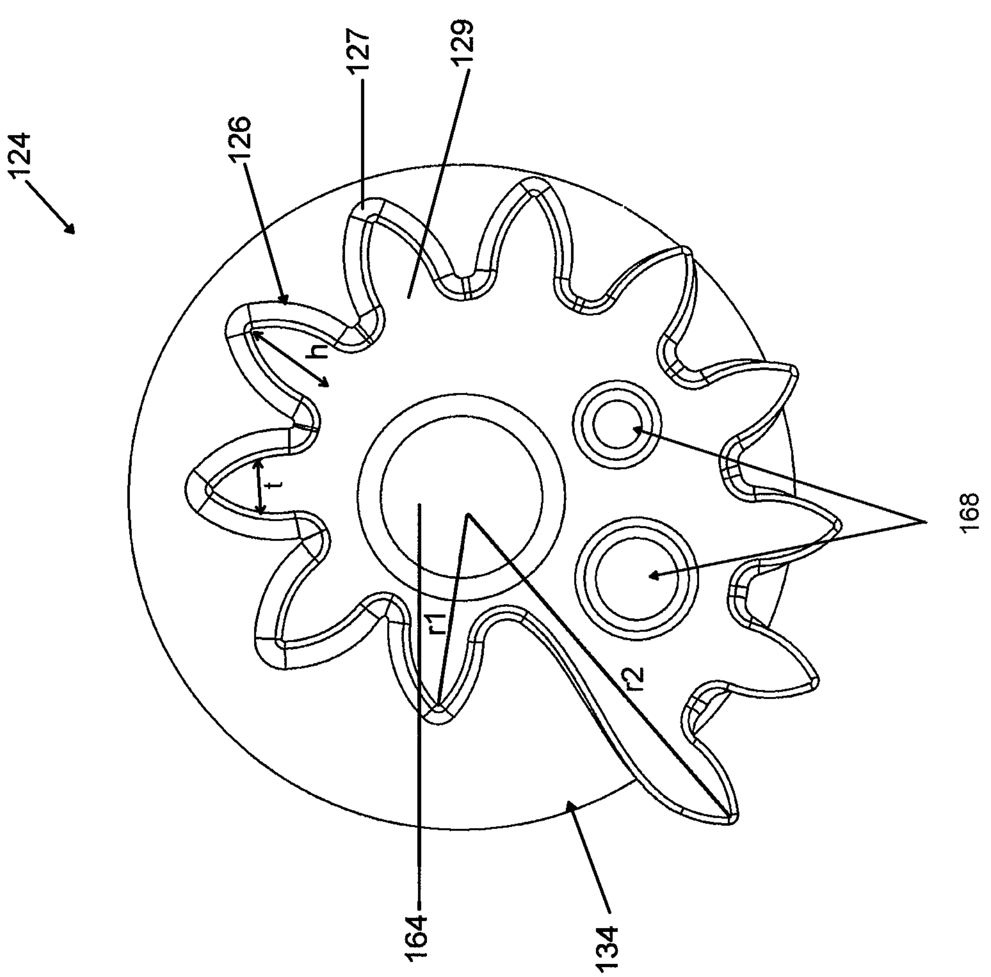
FIG. 14 illustrates a top view of the pinion gear surface of the variable gear of FIG. 13.
Figure 15:
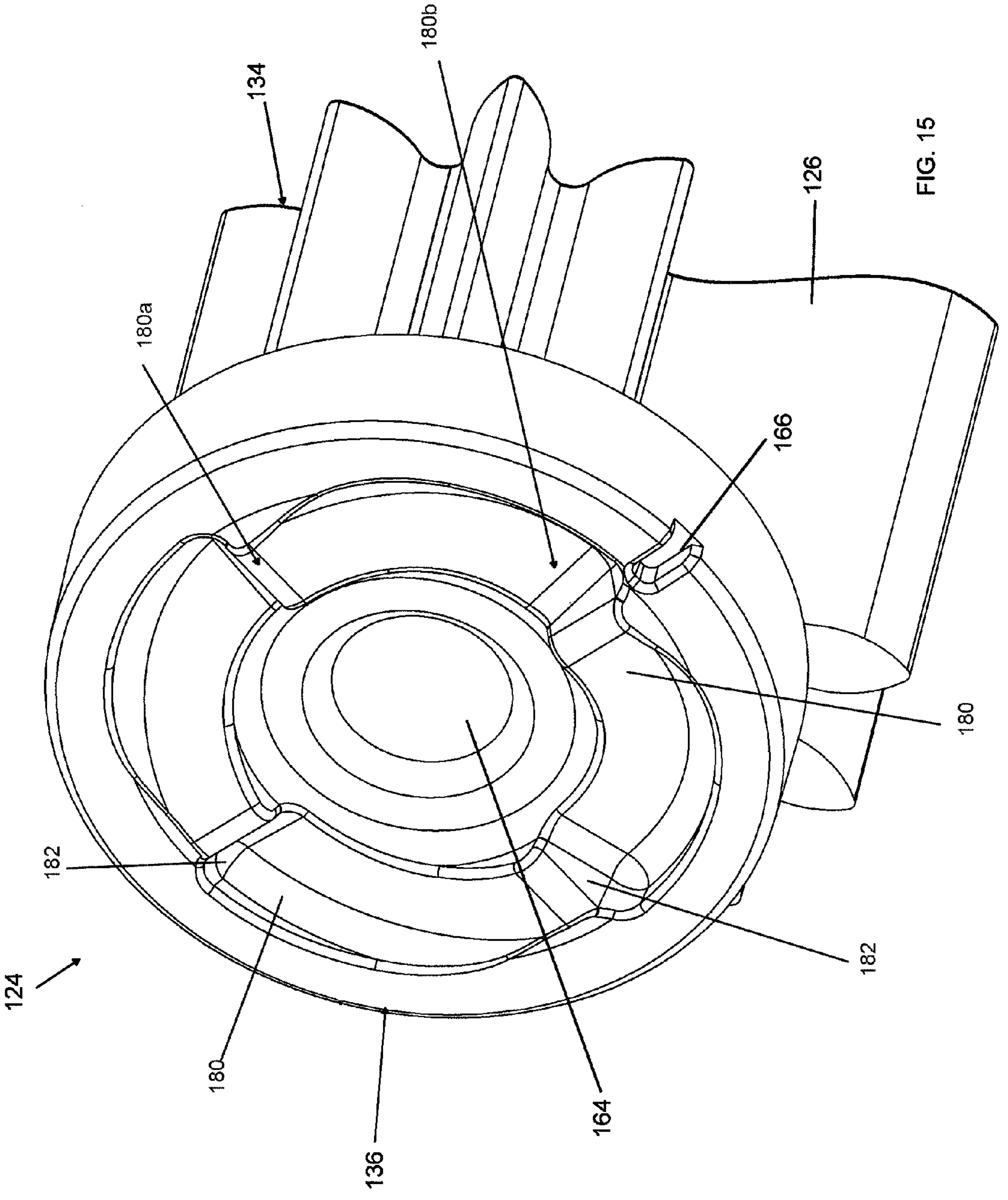
FIG. 15 illustrates a perspective view of a cam surface of the variable gear of FIG. 9.

In some embodiments, a portion of the drive shaft 120 is received in an opening 164 in the variable gear 124. As shown in FIGS. 13-15, some embodiments of the opening 164 in the variable gear 124 is generally circular in shape. In certain embodiments, the diameter of the opening 164 is larger than the diameter of the drive shaft 120. Thus, in such embodiments, the drive shaft 120 does not directly drive the variable gear 124. Rather, in certain configurations, the variable gear 124 and the drive shaft 120 can rotate relative to each other (e.g., at different speeds). In other configurations, the variable gear 124 and the drive shaft 120 rotate at the same speed. For example, in certain arrangements, the drive shaft 120 can rotate the clutch member 140, which in turn rotates the variable gear 124 (e.g., by friction between the clutch member 140 and the variable gear 124).

Figure 19:
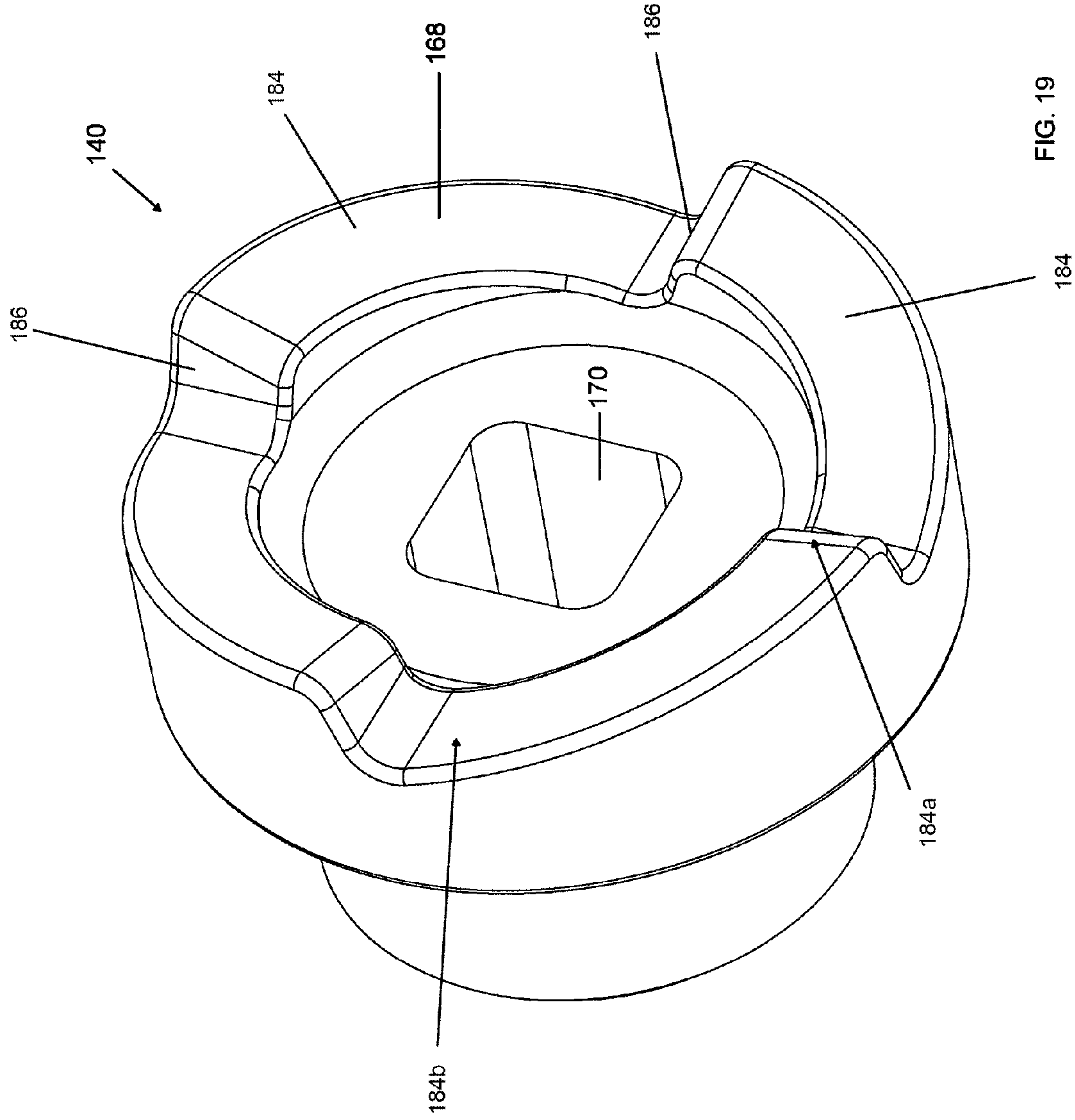
FIG. 19 illustrates a perspective view of a cam surface of the clutch member of FIG. 9.

In certain embodiments, a portion of the drive shaft 120 is received by a receiving feature, such as an opening 170, in the clutch member 140, such as is shown in FIG. 19. Some embodiments of the opening 170 are configured to receive a portion of the drive shaft 120. In certain implementations, the opening 170 and the second shaft region 158 of the drive shaft 120 have generally corresponding shapes For example, certain embodiments of the opening 170 and the second region 158 of the drive shaft 120 are generally square in cross-sectional shape (see FIGS. 12 and 19). Thus, certain variants of the clutch member 140 are configured to be engaged with, and directly driven (e.g., rotated) by, the drive shaft 120.

In some embodiments, the clutch member 140 is able to move (e.g., translate) longitudinally along a portion of the length of the drive shaft 120 (e.g., away from the variable gear 124 and/or the motor 112). As will be discussed in more detail below, in some embodiments, the ability of the clutch member 140 to move along the drive shaft 120 can facilitate manual operation of the lid 24 in certain circumstances. In certain variants, a biasing member 142, such as a spring, biases the clutch member 140 generally toward the variable gear 124.

With regard to FIGS. 13-15, an embodiment of the variable gear 124 is illustrated. The variable gear 124 can have one or more torque transmission features, such as teeth 126, and the opening 164 through which the drive shaft 120 can extend. Some embodiments of the variable gear 124 have a pinion gear side 134, as shown in FIGS. 13 and 14, and a cam surface side 136, as shown in FIG. 15. Certain variants include one or more additional voids 168, which can facilitate manufacturing, lessen material costs, and/or reduce weight of the variable gear 124.

In some embodiments, one or more of the teeth 126 includes an apex 127 and a base region 129. Each apex 127 can be pointed or blunt. Each tooth can have a tooth radius, which is the distance from the radial center of the opening 164 (about which the variable gear 124 rotates) to the apex of the tooth. In some embodiments, the variable gear 124 includes an outer diameter, which is the distance from the apex of a tooth to the apex of a generally diametrically opposite tooth.

As illustrated, one or more of the teeth 126 can have valleys (e.g., a radiused regions) on each side and which can connect adjacent teeth. The radially innermost portions of valleys of on either side of a tooth can define a root radius of the tooth. Each of the teeth 126 can have a depth h, which is measured from the apex 127 to the root radius of the tooth. In some embodiments, the depth h is generally constant from tooth to tooth. In some embodiments, the depth h is variable. For example, in some variants, the depth h is proportional to the tooth radius of the tooth.

In some embodiments, the teeth 126 include a tooth pitch p, which is the distance between leading or trailing edges of adjacent teeth. The tooth pitch p can be configured to achieve desired loads, speed, etc. In certain embodiments, the tooth pitch p is generally constant around the entire variable gear 124. In some embodiments, the tooth pitch p is variable. For example, the tooth pitch p can be related to the tooth radius (e.g., the tooth pitch p increases as the tooth radius increases).

In certain implementations, the teeth 126 include a tooth thickness t, which is the circumferential thickness at about the midpoint between the apex and the root diameter of the tooth. The tooth thickness t can be constant or varied. For example, in some embodiments, the tooth thickness is a function of the tooth radius (e.g., the tooth thickness t decreases as the tooth radius increases). Certain configurations of the variable gear 124 have thicker teeth 126 that engage with the lifting member 106 during periods of increased load (e.g., when the lid is closed and thus generally horizontally disposed). Some variants have thinner teeth 126 that engage with the lifting member 106 during periods of reduced load (e.g., when the lid is positioned at an angle that is at least about 45° and/or less than or equal to about 90° relative to the ground).

In some embodiments, as shown in FIGS. 13 and 14, the tooth radii vary about the circumference of the gear 124. For example, a first tooth radius $r_1$, measured from the center of the shaft opening 164 to a first tooth apex, is different from a second tooth radius $r_2$, measured from the center of shaft opening 164 to a second tooth apex. In certain embodiments, some or all of the tooth radii generally increase as a function of distance from the tooth with the shortest tooth radius (e.g., around the circumference of the gear 124). In some embodiments, the difference between the tooth radii of adjacent teeth is generally constant (aside from the difference between the shortest and longest tooth $r_1$, $r_2$ as shown).

In some embodiments, the radii of the variable gear 124 can vary such that the radius gradually increases from tooth to tooth around the circumference of the gear 124. In certain embodiments, the increase in tooth radius is rapid and/or discontinuous. For example, the radius of a tooth may be double, triple, or more, the radius of an adjacent tooth. In some embodiments, the radius can increase and decrease from tooth to tooth around the variable gear 124.

In some embodiments, the shortest tooth radius of the variable gear 124 is greater than about 1 mm and/or less than or equal to about 10 mm. In certain variants, the shortest tooth radius is greater than about 2.5 mm and/or less than or equal to about 7.5 mm. The shortest tooth radius of some implementations is greater than about 4 mm and/or less than or equal to about 5 mm. In some embodiments, the shortest radius is about 4.5 mm.

In some embodiments, the longest tooth radius of the variable gear 124 is greater than about 5 mm and/or less than or equal to about 15 mm. In some embodiments, the longest tooth radius is greater than about 7.5 mm and/or less than or equal to about 12.5 mm. The longest tooth radius of certain variants is greater than about 9 mm and/or less than or equal to about 10 mm. In some embodiments, longest radius is about 9 mm. In some embodiments, the ratio of the tooth radius of the longest tooth to the tooth radius of the shortest tooth is greater than or equal to about: 1.25:1, 1.5:1, 2:1, 3:1, values in between, or otherwise.

In some embodiments, the radius generally constantly increases between adjacent teeth of the variable gear 124. For example, the increase can be greater than about 0.1 mm and/or less than or equal to about 1.0 mm. In some implementations, the increase is greater than about 0.25 mm and/or less than or equal to about 0.75 mm. In some embodiments, the increase is greater than about 0.4 mm and/or less than or equal to about 0.5 mm. In some embodiments, the increase of the tooth radius between adjacent teeth is about 0.45 mm. In certain variants, the radius generally between adjacent teeth of the variable gear 124 changes non-linearly. For example, in some embodiments, the difference between the tooth radius of adjacent teeth changes in a non-linear manner.

A variable, or non-constant, tooth radius may be desirable at least in part because a smaller tooth radius can be advantageous in certain instances, and a larger tooth radius can be advantageous in other instances. For example, a smaller tooth radius may be desirable when an increased level of torque is to be transmitted, as the moment arm between the center of the gear and the tooth is reduced and thus the stress on the gear can be reduced. In some embodiments, this increase in torque is helpful in overcoming the moment of inertia of the resting lid 24 in the closed position. This mechanically induced increase in torque can require less power to be produced by the motor 112 to lift the lid 24. This can help prolong the power stored in the battery to operate the trash can 20 and/or can reduce the size and/or capacity of the motor 112, which can provide for cost and space savings. However, a larger tooth radius can increase the angular velocity of the gear, which can allow for more rapid movement (e.g., opening of the lid 24).

As previously noted, the variable gear 124 can have teeth 126 with variable radii. Such a configuration can, for example, allow for the lid 24 to be moved (e.g., opened) more efficiently, smoothly, rapidly, or otherwise. For example, the gear 124 can be configured to engage one or more of the teeth 126 that have a smaller tooth radius with the lifting member 106 in order to drive a lid 24 from the closed (e.g., generally horizontal) position, which generally presents the longest moment of force on the lid 24 and can impose higher stress on the motor and gear assembly.

In some embodiments, as the lid 24 rotates open, the horizontal moment arm of the lid 24 decreases, which decreases the moment of force from gravity and may decrease the stress on the motor and gear assembly. Thus, some embodiments are configured to engage the teeth 126 having a progressively larger tooth radius with the lifting member 106 as a function of the rotation of the lid 24. For example, the tooth radius can increase as the percentage of open (e.g., the rotational distance that the lid 24 has rotated from closed to open, divided by the total rotational distance that the lid 24 rotates from closed to open) of the lid 24 increases. In certain variants, the progressively increasing tooth radius of the teeth engaged with the lifting member 106 results in the lid 24 being progressively driven open more quickly.

In some embodiments, the tooth depth h remains substantially the same around the generally entire variable gear 124. In certain variants, the tooth depth h varies from tooth to tooth. In some embodiments, the tooth depth h increases (e.g., gradually) from tooth to tooth. In certain embodiments, the change in tooth depth h is rapid or discontinuous. For example, a first tooth depth can be at least about double or triple a second tooth depth. In some embodiments, the tooth depth increases and decreases from tooth to tooth around the variable gear 124.

In some arrangements, an increase in the tooth depth h can increase the strength of the tooth (e.g., by providing more area over which to distribute a load). In some embodiments, the tooth depth h increases as the tooth radius increases. In certain variants, the tooth depth h increases as the radius tooth radius decreases.

As previously noted, in some scenarios, it may be desirable to have a variable gear 124 having varied tooth radii. In certain implementation, a rack (e.g., the lifting member 106) and pinion (e.g., the variable gear 124) mechanism with larger teeth radii can drive the lid 24 open more quickly. However, in certain scenarios, engagement of teeth with larger radii may be less capable of withstanding some types of stress than a configuration in which teeth with shorter radii are engaged. Thus, some embodiments of the variable gear 124 are configured to drive the lid 24 open with a portion of a variable gear 124 having shorter teeth when the lid 24 in or near the closed position (e.g., when additional force is necessary to open). Some embodiments of the variable gear 124 are configured to drive the lid 24 open with progressively larger teeth as the level of force to open the lid decreases. In some embodiments, the variable gear 124 is configured to accelerate the rate at which the lid 24 is opened. For example, the variable gear 124 can engage teeth 126 having a progressively increasing tooth radius as the lid moves from open to closed.

In several embodiments, the variable gear 124 can engage or interact with the lifting member 106, such as to open the lid 24. For example, the lifting member 106 and variable gear 124 can be configured as a rack and pinion. In certain implementations, the lifting member 106 is positioned generally perpendicular to the longitudinal axis of the motor 112. As shown in FIGS. 7 and 8, the teeth 128 of the lifting member 106 can interact with the teeth 126 of variable gear 124.

Figure 16:
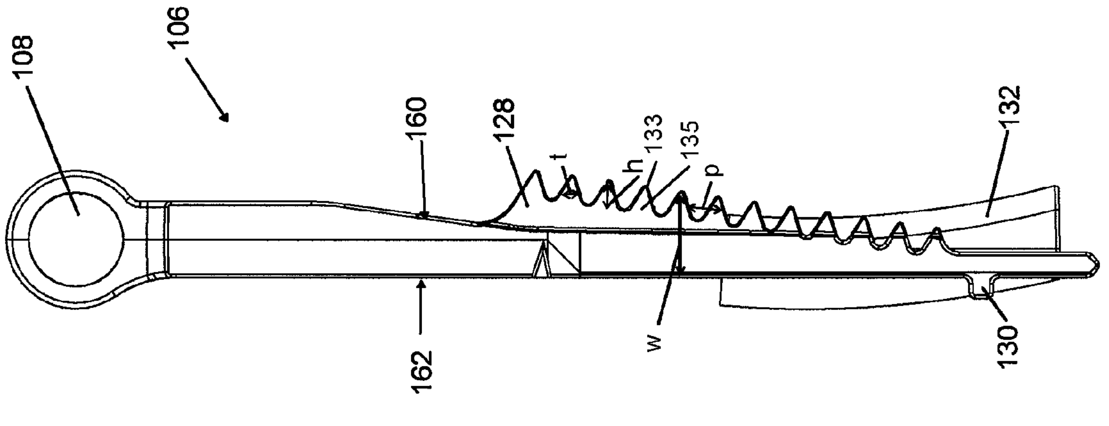
FIG. 16 illustrates a side view of the lifting member of FIG. 9.
Figure 17:
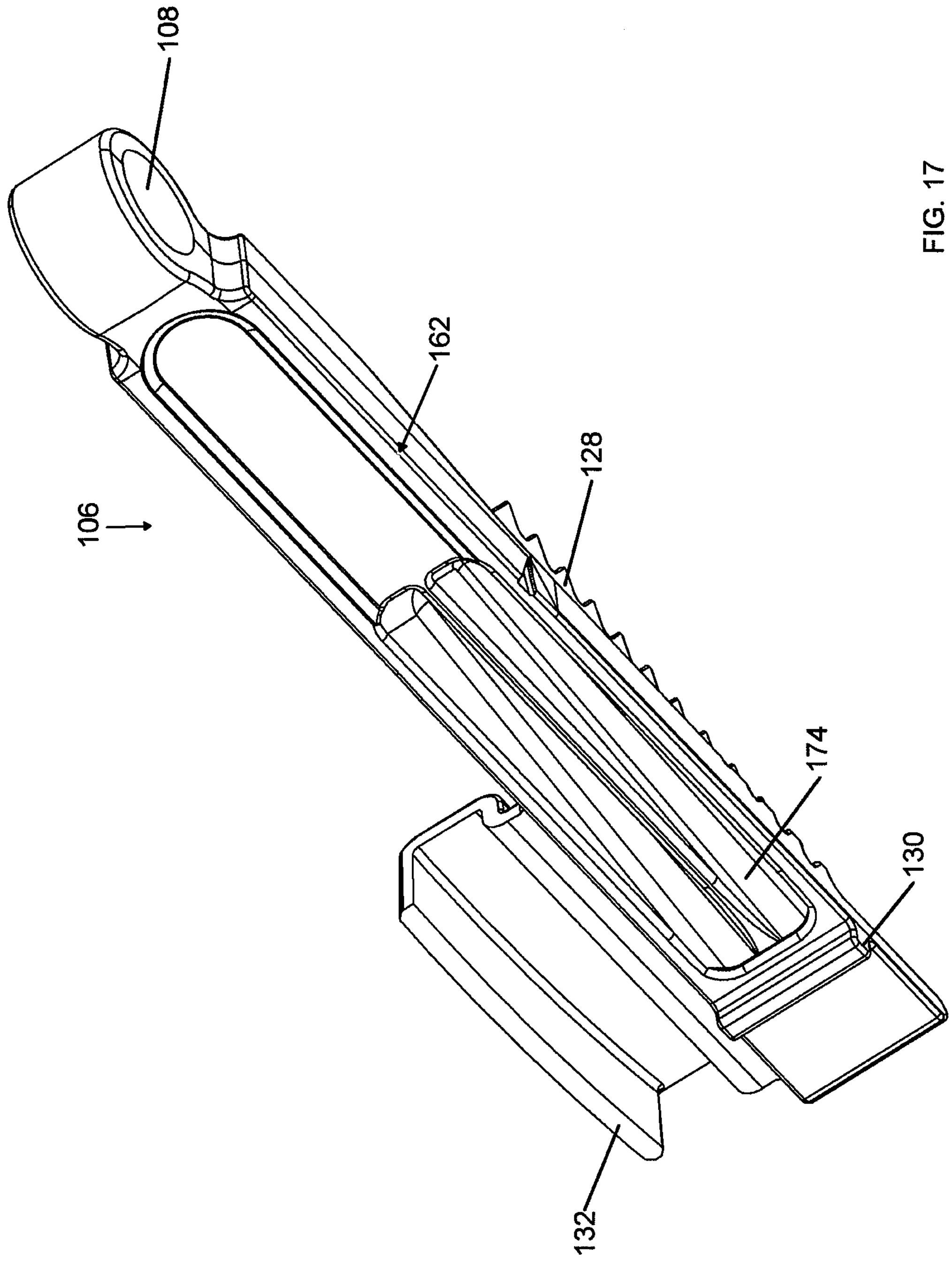
FIG. 17 illustrates a perspective view of a roller side surface of the lifting member of FIG. 9.
Figure 18:
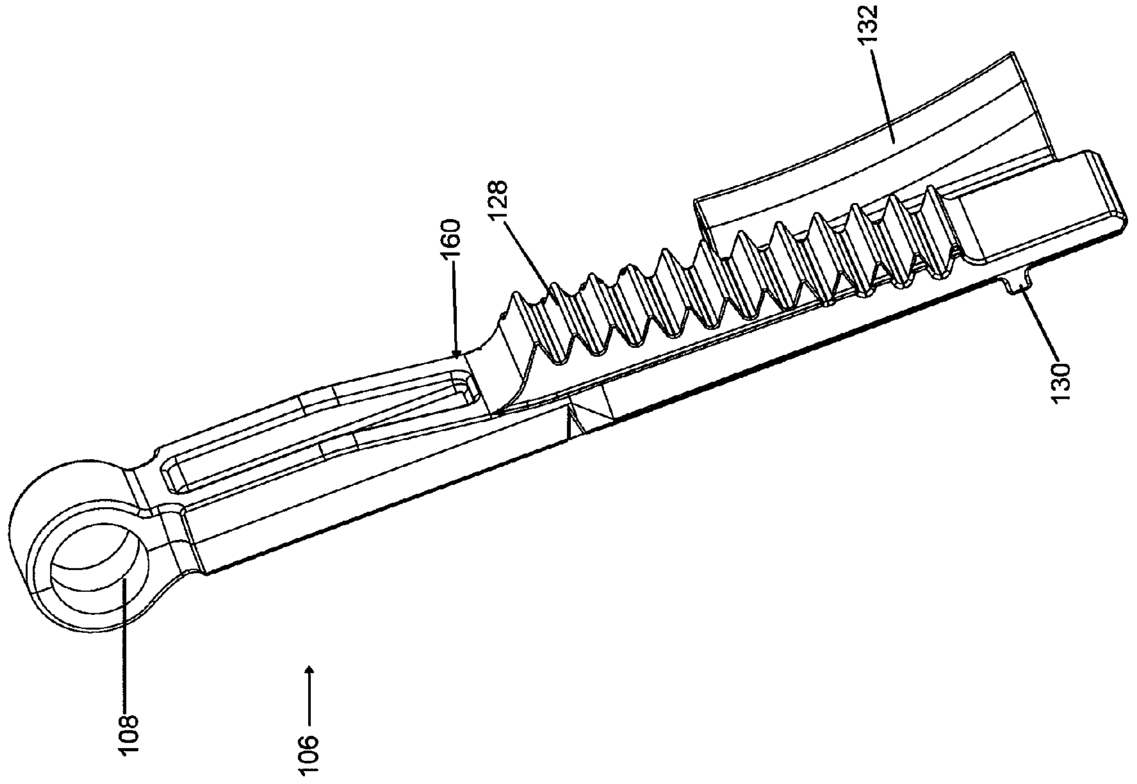
FIG. 18 illustrates a perspective view of a pinion side surface of the lifting member of FIG. 9.

FIGS. 16-18 depict an embodiment of a lifting member 106. In several embodiments, the lifting member 106 comprises a substantially elongate member, which can be configured to act as a rack gear. As illustrated, in some embodiments, lifting member 106 has a pinion side surface 160 having one or more teeth 128. The teeth 128 can be configured to interact with the teeth 126 of the variable gear 124. In some embodiments, the lifting member 106 acts as a pivoting rack gear. In some embodiments, lifting member 106 can include the linkage attachment member, such as the eyelet 108, that connects to the lid 24 directly or indirectly (e.g., via an intermediate linkage (not shown)). In certain variants, the eyelet 108 is positioned at an end of the lifting member 106.

Figure 20:
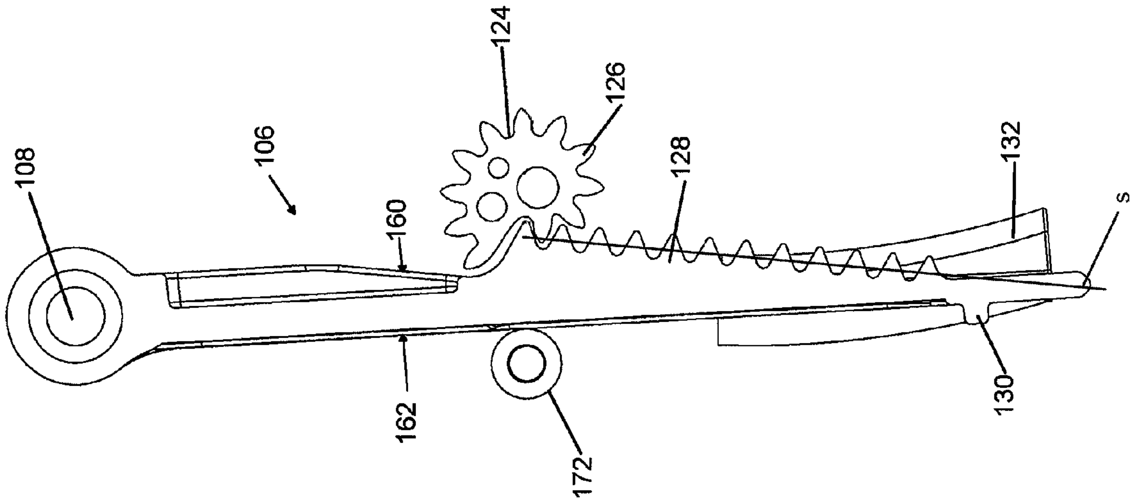
FIG. 20 illustrates a side view of the lifting member and the variable gear of FIG. 9, when the trash can lid is in a closed position.
Figure 21:
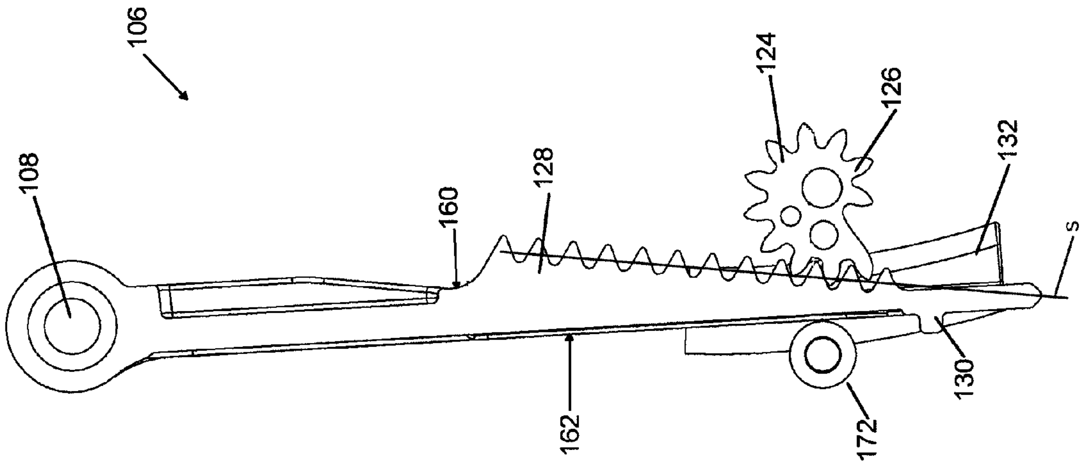
FIG. 21 illustrates a side view of the lifting member and the variable gear of FIG. 9, when the trash can lid is in an open position.

In some embodiments, lifting member 106 includes a guide surface 162. As shown in FIGS. 20 and 21, in certain implementations, a guide, such as a guide roller 172, engages the guide surface 162. Certain embodiments of the guide roller 172 provide support for the lifting member 106. Some embodiments of the guide roller 172 reduce the likelihood of misalignment of the lifting member 106 (e.g., kinking or becoming disengaged with the variable gear 124).

The lifting member 106 can have a recessed portion 174 on the guide surface 162. The recessed portion 174 can facilitate manufacturability of the lifting member 106. The recessed portion is generally configured to not inhibit movement of the guide roller 172 along the guide surface 162 (e.g., the recessed portion 174 is configured such that the guide roller 172 does not enter the recessed portion 174).

In some embodiments, the lifting member 106 can include a stopping member 130, which can inhibit the lifting member 106 from moving past a predetermined position. For example, the stopping member 130 can inhibit the lifting member 106 from moving toward the base portion 44 of the trash can assembly 20 to such an extent that the lifting member 106 disengages with the teeth 126 of the variable gear 124. In certain variants, the stopping member 130 can be positioned along the guide surface 162. Some embodiments have the stopping member 130 located at, near, or adjacent to an end generally opposite the eyelet 108.

In some embodiments, the lifting member 106 can include a flagging member 132. As shown, in certain variants, the flagging member 132 is positioned along a side of the lifting member 106. Some embodiments have the flagging member 132 positioned at, near, or adjacent to an end generally opposite the eyelet 108. The flagging member 132 can be used to indicate the position of the lifting member 106, in cooperation with one or more position sensors, which can be positioned on a circuit board in the housing 104 (not shown). In certain embodiments, based on the detected position of the lifting member 106, the position of the lid 24 can be determined (e.g., by a processor implementing an algorithm).

In some embodiments, the lifting member 106 has a plurality of teeth 128 along the pinion side surface 160. In certain implementations, one or more of the teeth 128 have an apex 133 and a base region 135. The apex 133 can be pointed or blunt. Similar to the discussion above in connection with the variable gear 124, the teeth 128 of the lifting member 106 can include a tooth pitch p, tooth depth h, and tooth thickness t. As shown, the tooth pitch p, tooth depth h, and tooth thickness t of the teeth 128 are generally constant. In certain embodiments, the tooth pitch p, tooth depth h, and/or tooth thickness t of one or more of the teeth 128 change along the a portion of the length of the lifting member 106.

In some embodiments, the teeth 128 of the lifting member 106 have a transverse width w, which can be the distance from the guide surface 162 to the apex 133 of one or more of the teeth 128. In certain variants, the transverse width w of the teeth 126 is generally constant. In certain embodiments, the transverse width w varies from tooth to tooth. For example, as illustrated in FIG. 16, the teeth 128 transverse width w can increase (e.g., generally linearly) toward the end of the lifting member 106 with the eyelet 108.

In some embodiments, as the lifting member 106 and the variable gear 124 engage, the sum of the transverse width w of the engaged tooth 128 of the lifting member 106 and the tooth radius (e.g., $r_1$, $r_2$, etc.) of the engaged tooth 126 of the variable gear 124 is generally constant. For example, in some embodiments, as the tooth radius of the variable gear 124 increases (e.g., during opening of the lid 24), the transverse width w of the tooth 128 of that is engaged with the tooth 126 decreases. In certain embodiments, the distance (e.g., generally transverse to the guide surface) between the guide surface 162 of the lifting member 106 and about the center of the opening 164 of the variable gear 124 is substantially constant. For example, in some implementations, throughout the normal operation of the lifting member 106 and the variable gear 124, the distance between the guide surface 162 and about the center of the opening 164 is greater than or equal to about 4.0 mm and/or less than or equal to about 13.0 mm.

In some embodiments, the teeth 128 extend along a portion of the lifting member 106. In certain embodiments, the linear distance between the outermost of the teeth 128 is about equal to the circumference of the variable gear 124. Thus, in some embodiments, the teeth 128 at or near a first end of the teeth 128 are engaged with the variable gear 124 when the lid 24 is at or near a first position (e.g., closed). In certain variants, the teeth 128 at or near a second end of the teeth 128 are engaged with the variable gear 124 when the lid 24 is at or near a second position (e.g., open).

In some embodiments, the transverse width w varies along the lifting member 106. In some embodiments, the tooth depth h and thickness t remain substantially the same from tooth to tooth. Certain variants have the teeth 128 positioned at a gradual incline, as depicted in FIG. 16, such that the transverse width t decreases from tooth to tooth, moving from the tooth 128 closest to the eyelet 108 end to the tooth 128 closest to the stopping member 130.

In some embodiments, the transverse width w of lifting member 106 gradually increases or decreases (e.g., linearly, exponentially, or otherwise) from tooth to tooth. In certain embodiments, the increase or decrease may be rapid or discontinuous. For example, a first transverse width w across a first tooth can be greater than or equal to approximately double or approximately triple the distance of a second transverse width w across a second tooth.

In some embodiments, the distance from the guide surface 162 to the base region of each tooth 128 is generally the same as the portion (e.g., the extent of the teeth 128) of the lifting member 106. In certain embodiments, the tooth depth h varies from tooth to tooth. In some embodiments, the tooth depth h gradually increases (e.g., linearly, exponentially, or otherwise) from tooth to tooth. In certain embodiments, the change in tooth depth h is rapid or discontinuous. For example, a first tooth depth can be greater than or equal to approximately double or approximately triple a second tooth depth.

As shown in FIGS. 20 and 21, the lifting member 106 and the variable gear 124 can be configured such that the variable gear teeth 126 interact with the lifting member teeth 128. As also shown, certain embodiments of the teeth 128 are oriented at a slope S compared to the generally flat guide surface 162. At least in part because of the slope S, certain of the teeth 128 have a greater transverse width w than other of the teeth 128. In some embodiments, the slope S of the teeth 128 can be configured such that portions of the variable gear 124 having shorter tooth radii interact with portions of the lifting member 106 having a longer transverse width w (FIG. 20). In some embodiments, portions of the variable gear 124 with longer tooth radii interact with portions of the lifting member 106 having shorter transverse width w (FIG. 21). In certain variants, the teeth 128 of the lifting member 106 generally remain in engagement with the variable gear teeth 126 throughout the movement of the lid 24 between open and closed positions.

In some embodiments, when the trash can is at or near the closed position, the variable gear 124 is positioned on the tooth 128 near or closest to eyelet 108, as shown in FIG. 20. As the variable gear 124 rotates (e.g., in a clock-wise direction), the lifting member 106 translates upward, thereby driving the lid 24 open. As the lifting member moves upward, it moves in relation to the guide roller 172. For example, the guide roller 172 can roll along a portion of the guide surface 162. In some embodiments, when the trash can is at or near the closed position, the variable gear 124 is positioned on the tooth 128 near or closest to the end of the lifting member 106 generally opposite the eyelet 108, as depicted in FIG. 21.

Several embodiments of the lifting member 106 and the variable gear 124 can be configured to efficiently open the lid 24. In some embodiments, the variable gear 124 is configured to balance strength (e.g., the capability of the gears 124 to withstand the force incurred during the initial stage of opening the lid 24) and speed (e.g., the rate at which the lid 24 is moved). As discussed above, certain embodiments of the variable gear 124 can be modified to provide additional strength or additional speed by modifying the extent and/or rate of change of the tooth radii generally around the circumference of the gear 124. For example, if increased velocity of the lid 24 is desired, the tooth radii of the teeth 126 can be increased (e.g., from about a 2 mm radius difference between adjacent teeth, to about 4 mm radius difference between adjacent teeth).

In the embodiment depicted in FIG. 20, when the trash can lid 24 is in the closed (e.g., generally horizontal) position, the variable gear 124 is positioned such that the teeth 126 with the shortest tooth radii interact with the lifting member 106. Such a configuration can facilitate applying the necessary force to open the lid 24 when the moment arm is the longest. In certain embodiments, as the amount of force necessary to open the lid 24 decreases, the radius of the variable gear 124 increases, which in turn can accelerate the movement of the lid 24. Thus, certain embodiments of the trash can assembly 20 can be configured to open the lid 24 more rapidly and/or with a less power demand or stress on the motor 112 and/or other components than devices without the variable gear 124.

In some embodiments, the lifting mechanism 102 is configured to permit manual operation of the lid (e.g., operation without the motor). For example, some embodiments allow the lid 24 to be opened and/or closed without, or against, the rotation of the motor 112. In some embodiments, the lifting mechanism 102 is configured to permit the variable gear 124 to rotate relative to the drive shaft 120 and/or the motor 112. For example, in certain variants, manual opening or closing of the lid 24 moves the lifting member 106, which rotates the variable gear 124, and the drive shaft 120 remains generally stationary.

In some embodiments, the variable gear 124 includes a first cam surface 180 and a first return surface 182. As shown in FIG. 15, the first cam surface 180 can be inclined from a first level to a second level, in relation to a plane extending generally transverse to the centerline of the opening 164 in the gear 124. The first return surface 182 can intersect the first cam surface 180 and can be disposed between the first and second levels.

In some embodiments, the clutch member 140 includes a second cam surface 184 and a second return surface 186. As illustrated in FIG. 19, the second cam surface 184 can be inclined from a first level to a second level, in relation to a plane extending generally transverse to the centerline of the opening 170 in the clutch member 140. The second return surface 186 can intersect the first cam surface 184 and can be disposed between the first and second levels.

As shown in FIG. 8, the cam surface 184 and the second return surface 186 can be shaped to correspond with the first cam surface 180 and the first return surface 182 of the variable gear 124, thereby allowing mating engagement of the variable gear 124 and the clutch member 140. For example, summits 180*a* of the inclined cam surface 180 can be nested in the valleys 184*b* of the inclined cam surface 184, and summits 184*a* of the inclined cam surface 184 can be nested in the valleys 180*b* of the inclined cam surface 180.

In certain variants, when the lid 24 is moved manually, the lifting member 106 is moved, which in turn rotates the variable gear 124. As previously discussed, the opening 164 in the variable gear 124 is configured so that the gear 124 can rotate in relation to the drive shaft 120. For example, the opening 164 is generally round and has a diameter larger than the diameter of the drive shaft 120. In some embodiments, the variable gear 124 is positioned on the first shaft region 156 (e.g., the round region of the shaft 120). In certain variants, the variable gear 124 is positioned on the second shaft region 158 (e.g., the generally square region of the shaft 120). Typically, the diameter of the opening 164 can be larger than the largest transverse dimension (e.g., the diameter or the distance between generally opposite corners) of the shaft 120. Thus, in certain embodiments, rotation of the variable gear 124 during manual operation of the lid 24 may not be transmitted to the drive shaft 120, coupling mechanism 11, and/or motor 112. Rather, certain embodiments are configured to permit the variable gear 124 to rotationally "slip" relative to the drive shaft 120, coupling mechanism 11, and/or motor 112.

As previously discussed, in some embodiments, torque from the motor 112 can be transmitted through the coupling mechanism 111 and the drive shaft 120. In some embodiments, the motor torque is transmitted to the clutch member 140 via the generally square second region 158 of the drive shaft 120, which engages the generally square aperture 170 in the clutch member 140. Thus, in certain variants, the clutch member 140 is inhibited or prevented from rotating relative to the shaft 120. In certain implementations, the clutch member 140 is configured to transmit torque from the motor 112 to the variable gear 124, such as by friction between the first and second cam surfaces 180, 184 and/or between the first and second return surfaces 182, 186.

In some embodiments, the clutch member 140 can translate along a portion of the longitudinal length of the drive shaft 120. As shown, a retaining member 141 (e.g., a nut and washer assembly) can retain the biasing member 142, which can bias the clutch member 140 into engagement with the variable gear 124. In some embodiments, translation of the clutch member 140 (e.g., in a direction away from the motor 112) along a portion of the drive shaft 120 is generally against the bias of the biasing member.

In some embodiments, when the lid 24 is manually operated, the variable gear 124 rotates. In certain implementations, when the lid 24 is manually operated, the clutch member 140 remains stationary. Some embodiments of the clutch member 140 remain stationary because, as noted above, the variable gear 124 can rotate without rotating the drive shaft 120, which can drive the clutch member 140. Thus, in certain configurations, the variable gear 124 rotates relative to the clutch member 140.

In some embodiments, rotation of the variable gear 124 relative to the clutch member 140 results in relative movement between the first and second inclined cam surfaces 180, 184. In certain configurations, the inclined cam surfaces 180, 184 slide relative to each other, which results in the inclined cams climbing each other. For example, as the inclined cam surfaces 180, 184 slide relative to each other, the summits 180*a*, 184*a* of the inclined cam surfaces 180, 184 circumferentially approach each other.

In certain embodiments, the relative movement between the first and second inclined cam surfaces 180, 184 (e.g., by the interaction of the inclines) urges the variable gear 124 and the clutch member 140 apart. For example, the variable gear 124 and the clutch member 140 can be urged in generally opposite directions along the longitudinal axis of the drive shaft 120. In some embodiments, the variable gear 124 is generally restrained from moving away from the clutch member 140 (e.g., by abutting with the coupling mechanism 111). However, certain embodiments of the clutch member 140 are able to move away from variable gear 124 by translating along the drive shaft 120 (e.g., against the bias of the biasing member 142). Thus, in certain implementations, relative rotation of the inclined cam surfaces 180, 184 results in the clutch member 140 translating along a portion of the longitudinal length of the drive shaft 120 (e.g., in a direction away from the motor 112), against the bias of the biasing member 142. Thus, some embodiments facilitate relative rotation of the variable gear 124 and the clutch member 140 without imposing undue stress on, or damage to, the variable gear 124, clutch member 140, drive shaft 120, and/or motor 112. Accordingly, manual operation of the lid 24 can be performed without imposing undue stress on, or damage to, components of the trash can assembly 20.

In some implementations, when manual operation of the lid 24 ceases, the bias of the biasing member 142 can return the clutch member 140 into generally full engagement with the variable gear 124. For example, after manual operation of the lid 24 ceases, the bias of the biasing member 142 can facilitate re-engagement of the inclined cam surfaces 180, 184. In some embodiments, re-engaging the clutch member 140 and the variable gear 124 allows the transmission of torque from the motor 112 to the variable gear 124, which can provide powered operation of the lid. Thus, some embodiments provide automatic and/or passive engagement and/or disengagement of the motor 112 and/or drive shaft 120 from the variable gear 124 and/or the lid 24.

Although the trash cans have been disclosed in the context of certain embodiments and examples, it will be understood by those skilled in the art that the present disclosure extends beyond the specifically disclosed embodiments to other alternative embodiments and/or uses of the trash cans and obvious modifications and equivalents thereof. In addition, while several variations of the trash cans have been shown and described in detail, other modifications, which are within the scope of the present disclosure, will be readily apparent to those of skill in the art. For example, additional and/or alternate gearing and/or torque transmission components can be included in the lifting mechanism 102. For instance, in some embodiments, the lifting mechanism 102 includes a gear reduction (e.g., greater than or equal to about 1:5, 1:10, 1:50, values in between, or any other gear reduction that would provide the desired characteristics), which can modify the rotational speed applied to the drive shaft 120, clutch member 140, variable gear 124, lifting member 106 and/or other components.

It is also contemplated that various combinations or subcombinations of the specific features and aspects of the embodiments can be made and still fall within the scope of the present disclosure. It should be understood that various features and aspects of the disclosed embodiments can be combined with or substituted for one another in order to form varying modes of the trashcans. Thus, it is intended that the scope of the present disclosure should not be limited by the particular disclosed embodiments described above.

The following is claimed:

1. A refuse receptacle comprising:

an outer shell component;

a lid mounted relative to the outer shell component portion and configured to move between an open position and a closed position;

a power supply;

a motor configured to be powered by the power supply; and a gear assembly configured to move the lid between the opened and closed positions, the gear assembly comprising a variable gear rotatably engaged with a lifting gear, the variable gear rotatable by the motor and including a first tooth and a second tooth, the first tooth having a first tooth radius and the second tooth having a second tooth radius that is greater than the first tooth radius, the rotation of the variable gear facilitating acceleration in the angular velocity of the lid during the movement of the lid between the opened and closed positions.

2. The receptacle of claim 1, wherein the variable gear comprises a plurality of teeth, each with a tooth radius.

3. The receptacle of claim 2, wherein each tooth has a unique tooth radius.

4. The receptacle of claim 2, wherein the tooth radii generally increase around the circumference of the variable gear.

5. The receptacle of claim 4, wherein the tooth having the longest tooth radius is engaged with the lifting gear when the lid is in the open position.

6. The receptacle of claim 4, wherein the tooth having the shortest tooth radius is engaged with the lifting gear when the lid is in the closed position.

7. The receptacle of claim 1, wherein the lifting gear comprises a rack gear having a first transverse width and a second transverse width, the first transverse width being different than the second transverse width.

8. The receptacle of claim 7, wherein, during movement of the lid between the opened and closed positions, at least one tooth of the variable gear is engaged with at least one tooth of the rack gear, and the sum of the tooth radius and the transverse width of the engaged teeth is generally constant.

9. The receptacle of claim 1, further comprising a coupling mechanism configured to inhibit vibration from the motor from being transmitted to the variable gear.

10. The receptacle of claim 1, further comprising a drive shaft rotated by the motor, the drive shaft comprising a first portion having a generally round cross-section and a second portion having a generally rectangular cross-section.

11. The receptacle of claim 1, further comprising a clutch member configured to engage with the variable gear.

12. The receptacle of claim 11, wherein the variable gear further comprises a first inclined cam surface and the clutch member comprises a corresponding second inclined cam surface configured to nest with the first inclined cam surface.

13. The receptacle of claim 1, wherein the lid is disposed generally parallel with the ground on which the receptacle is located in the closed position, and the lid is disposed generally perpendicular to the ground in the open position.

14. A trash can configured for manual and powered operation, the trash can comprising:

an outer shell component;

a lid mounted relative to the outer shell component and configured to move between an open position and a closed position;

a power supply;

a motor configured to be powered by the power supply;

a lifting mechanism operably connected with the motor and the lid such that powered operation of the motor can drive the lid between the open and closed positions via the lifting mechanism; and a clutch engaged with the lifting mechanism and configured to transmit torque from the motor to a portion of the lifting mechanism during powered operation of the lid by the motor, the clutch configured to at least partly disengage from the lifting mechanism during manual operation of the lid to allow the portion of the lifting mechanism to rotate relative to the clutch, thereby facilitating manual operation of the lid without damage to the lifting mechanism;

wherein, after manual operation of the lid has ceased, the clutch is automatically reengaged with the lifting mechanism, thereby facilitating subsequent powered operation of the lid.

15. A trash can configured for manual and powered operation, the trash can comprising:

an outer shell component;

a lid mounted relative to the outer shell component and configured to move between an open position and a closed position;

a power supply;

a motor configured to be powered by the power supply;

a lifting mechanism operably connected with the motor and the lid such that powered operation of the motor can drive the lid between the open and closed positions via the lifting mechanism;

a clutch engaged with the lifting mechanism and configured to transmit torque from the motor to a portion of the lifting mechanism during powered operation of the lid by the motor, the clutch configured to at least partly disengage from the lifting mechanism during manual operation of the lid to allow the portion of the lifting mechanism to rotate relative to the clutch, thereby facilitating manual operation of the lid without damage to the lifting mechanism; and a biasing member configured to bias the clutch into engagement with the lifting mechanism.

16. A trash can configured for manual and powered operation, the trash can comprising:

an outer shell component;

a lid mounted relative to the outer shell component and configured to move between an open position and a closed position;

a power supply;

a motor configured to be powered by the power supply;

a torque transmission component operably connected with the motor and the lid such that powered operation of the motor can drive the lid between the open and closed positions via the torque transmission component;

a clutch engaged with the torque transmission component and configured to transmit torque from the motor to a portion of the torque transmission component during powered operation of the lid by the motor, the clutch configured to at least partly disengage from the torque transmission component during manual operation of the lid to allow the portion of the torque transmission component to rotate relative to the clutch, thereby facilitating manual operation of the lid without damage to the torque transmission component; and a drive shaft, the clutch being configured to translate along a portion of the drive shaft.

17. A trash can configured for manual and powered operation, the trash can comprising:

an outer shell component;

a lid mounted relative to the outer shell component and configured to move between an open position and a closed position;

a power supply;

a motor configured to be powered by the power supply;

a torque transmission component operably connected with the motor and the lid such that powered operation of the motor can drive the lid between the open and closed positions via the torque transmission component; and a clutch engaged with the torque transmission component and configured to transmit torque from the motor to a portion of the torque transmission component during powered operation of the lid by the motor, the clutch configured to at least partly disengage from the torque transmission component during manual operation of the lid to allow the portion of the torque transmission component to rotate relative to the clutch, thereby facilitating manual operation of the lid without damage to the torque transmission component;

wherein the torque transmission component comprises a first inclined cam surface and the clutch member comprises a corresponding second inclined cam surface configured to nest with the first inclined cam surface.

18. The trash can of claim 17, wherein, during manual operation of the lid, the first and second inclined cam surfaces slide relative to each other.

19. The trash can of claim 18, wherein, during manual operation of the lid, the clutch is urged in a direction generally away from the motor.

20. The trash can of claim 17, wherein the torque transmission component further comprises a gear assembly.

21. The trash can of claim 14, wherein the lifting mechanism comprises a gear assembly.

22. The trash can of claim 15, wherein the lifting mechanism comprises a gear assembly.

23. The trash can of claim 16, wherein the torque transmission component comprises a gear assembly.

* * * * *